(12) United States Patent
Ledinek

(10) Patent No.: US 11,338,470 B2
(45) Date of Patent: May 24, 2022

(54) AUTOMATIC MACHINE FOR WIDTH GLUING OF WOODEN LAMELLAS INTO LAMINATED PLATES OF OPTIONAL DIMENSIONS AND A METHOD RELATING THERETO

(71) Applicant: Gregor Ledinek, Maribor (SI)

(72) Inventor: Gregor Ledinek, Maribor (SI)

(*) Notice: Subject to any disclaimer, the term of this patent is extended or adjusted under 35 U.S.C. 154(b) by 0 days.

(21) Appl. No.: 17/025,561

(22) Filed: Sep. 18, 2020

(65) Prior Publication Data
US 2021/0086395 A1  Mar. 25, 2021

(30) Foreign Application Priority Data

Sep. 19, 2019 (SI) .................. P-201900176

(51) Int. Cl.
| | | |
|---|---|---|
| B27G 11/00 | (2006.01) | |
| B27M 3/00 | (2006.01) | |
| B32B 7/12 | (2006.01) | |

(52) U.S. Cl.
CPC .......... B27M 3/0053 (2013.01); B27G 11/00 (2013.01); *B32B 7/12* (2013.01); *B32B 2317/16* (2013.01)

(58) Field of Classification Search
CPC ... B27M 3/0053; B27M 3/0026; B27G 11/00; B32B 2317/16; B32B 7/12; B27D 3/04
See application file for complete search history.

(56) References Cited

U.S. PATENT DOCUMENTS

2019/0119930 A1* 4/2019 Blake .................. B32B 27/304

FOREIGN PATENT DOCUMENTS

| | | |
|---|---|---|
| DE | 2834288 A1 | 2/1980 |
| DE | 2940802 A1 | 4/1981 |
| DE | 3317522 A1 | 1/1985 |
| DE | 3921368 A1 | 10/1990 |
| DE | 4041553 A1 | 6/1992 |
| EP | 1157794 A2 | 11/2001 |
| EP | 1247628 A2 | 10/2002 |
| EP | 1669175 B1 | 2/2008 |
| EP | 3542981 A1 | 9/2019 |
| SI | 25323 A | 6/2018 |
| WO | 2017157518 A1 | 9/2017 |

* cited by examiner

*Primary Examiner* — Vishal I Patel
(74) *Attorney, Agent, or Firm* — McGlew and Tuttle, P.C.

(57) ABSTRACT

An automatic machine for width gluing of wooden lamellas into laminated plates of optional dimensions according to the invention consists of a press and a glue application device and enables fast continuous gluing of wooden lamellas of optional lengths, widths and thicknesses into laminated plates also of optional dimensions. The press is characterized by a modular construction, which consists of innovative supporting framework segments with intermediate work modules in a sequential string, which together enable transport of wooden lamellas, their pressing and gluing in the same plane within the entire construction of the press. Each work module consists of a work table assembly, a pressure shoes assembly and a segment pushers assembly. Within these assemblies, innovative constructions of segment pushers, long pressure shoes and short pressure shoes are characteristic.

10 Claims, 20 Drawing Sheets

CROSS SECTION A – A

CROSS SECTION B-B

CROSS SECTION C-C

AUTOMATIC MACHINE FOR WIDTH GLUING OF WOODEN LAMELLAS INTO LAMINATED PLATES OF OPTIONAL DIMENSIONS AND A METHOD RELATING THERETO

FIELD OF THE INVENTION

The subject of the invention is an automatic machine for width gluing of wooden lamellas into laminated plates of optional dimensions and a method relating thereto, more specifically, a press for fast continuous joining, pressing and width gluing of wooden lamellas of optional widths and lengths into laminated plates also of optional widths and lengths, without subsequent surface machining of laminated plates, after finished gluing, including a method relating thereto.

BACKGROUND OF THE INVENTION

There are many known solutions of machines or presses for pressing and gluing of wooden lamellas into laminated plates.

According to the document EP 1 669 175 B1, there is known a press for gluing of wooden lamellas into laminated plates and a pressing and gluing method in which the wooden lamellas are first loaded on a loading unit until the desired dimension of the final laminated plate is achieved. The wooden lamellas loaded in this way are pushed into the press in a package, afterwards the upper press segment is closed and, with pressing elements, the pressing force is applied to wooden lamellas. After pressing and gluing are finished, the press opens and the glued laminated plate is pushed out of the press. Then wooden lamellas are pushed into the press for the next laminated plate, and this process is repeated cyclically. Weakness and deficiency of this solution is primarily in that the dimensions of the laminated plates are limited as wooden lamellas are pressed and glued in it exclusively within the pressing area width, the dimension of which is limited and the final product is a dimensionally limited laminated plate. Further weakness and deficiency of this press is also the cyclic procedure of producing laminated plates, which does not enable fast continuous production.

According to the document DE 2 940 802 A1, a press is known for gluing and pressing of plates from wooden lamellas with one or both bevelled longer side edges, because of which the edges of two adjacent lamellas are not parallel to each other. Pressing and gluing are carried out with a pusher that pushes individual wooden lamellas between two horizontal heating plates. Weakness and deficiency of this solution is in the fact that, in the initial phase of pressing and gluing, wooden lamellas are not guided in the vertical direction because of which some wooden lamellas uncontrollably deviate from the right way. Furthermore, weakness and deficiency of this solution is in the fact that, due to the mode of execution of the supporting structure, it is impossible to glue wooden lamellas of optional lengths. Furthermore, weakness and deficiency of this solution is in that it does not enable simultaneous pressing and gluing and transport of wooden lamellas to the press, which is prevented by the construction of the pushers.

According to the document EP 1 157 794 A2, a machine for gluing plates from laminated wooden elements is known. Wooden lamellas are transported along the conveyor belt in longitudinal direction to the feed unit, whereas glue is applied simultaneously on their longitudinal edges with a glue application device. In the feed unit, wooden lamellas are then formed depending on the desired width of the laminated plate, which is limited with the width of the machine, similarly as its length. The laminated plate prepared in this way is then transported by means of conveyor belts or chains to the pressing area between the upper clamping unit and the lower pressing plate, where it is pressed in the vertical and horizontal directions. After gluing is finished, the upper clamping unit and the pushing plate are withdrawn to the standstill position, whereas the previously pressed and glued laminated plate is pushed out of the device, enabling the insertion of a new laminated plate, which is repeated cyclically. Weakness and deficiency of this machine or press is that it does not enable continuous manufacturing of glued laminated plates and also that the dimensions of laminated plates are limited with the dimensions of the machine. Furthermore, its weakness and deficiency is that the laminated plates are pressed and aligned with a pushing plate one side only, and in the opposite direction of operation of the pushing plate, there is no fixed rest and no pusher dogs that would ensure correct alignment of laminated plates.

According to the document SI 25323, a press for continuous pressing and gluing of wooden lamellas and a method of their pressing is known. Before entering the press, a layer of glue is applied on the longer side edges of the wooden lamellas, afterwards the wooden lamellas are transported to the press, where they are centre-aligned. Thereby the transverse pushers push the observed wooden lamella onto vertical pushers and in this way they provide space on the conveyor belt for the next lamella. The vertical pushers lower the observed wooden lamella to the height level of pressing and gluing, and afterwards, segment pushers push it into the press, which is in a continuous cyclical process repeated for each wooden lamella. After gluing is finished, the laminated plate is cut into desired dimensions with a cut-off saw. Weakness and deficiency of the press is in that the entry height of the wooden lamella differs from the exit height of the glued laminated plate, which is the consequence of inappropriate construction of segment pushers that do not enable the same entry and exit heights. Furthermore, its weakness and deficiency is also in that the pressing racks do not enable automatic force regulation while wooden lamellas are being pressed and glued, and, consequently, additional regulation with special hydraulic components is required. Furthermore, its weakness and deficiency is also in that the maximum length of the glued laminated plates is limited with the length of the press.

According to the document DE 39 21 368 A1, a device for pressing and gluing of wooden lamellas into laminated plates is known, which enables simultaneous pressing and gluing of wooden lamellas at two height levels. Prior to that, glue is applied to longer side edges of wooden lamellas and afterwards the wooden lamellas from the vertical package are put sequentially into a laminated plate of a limited width. Then drawbars are used to insert the laminated plate under a backstop and hydraulic cushion, where the lamellas are pressed and glued, which is cyclically repeated. Weakness and deficiency of this device is the dimensional limitation, as it does not enable pressing and gluing of endless long wooden lamellas into endless long laminated plates. Furthermore, its weakness and deficiency is that it does not enable the use of a fast-drying adhesive as the adhesive dries already in the phase when lamellas are put into the laminated plates. Its further weakness and deficiency is in that after gluing is finished, it does not enable automatic removal of laminated plates from the device. Also, its weakness and deficiency is that the hydraulic cushion may get stuck between higher and lower wooden lamellas, which demands higher pressing force required when gluing wooden lamellas.

According to the document EP 1 247 628 A2, a unit for feeding the press with wooden lamellas used for gluing into laminated plates is known. After glue is applied to longer side edges of wooden lamellas, they travel along the conveyor belt to the device where they are stopped and added. Each observed wooden lamella is stopped with its face side at the lifting and limiting plate and afterwards it is pushed transversely with a supporting unit to the preparation area where wooden lamellas are put together into a laminated plate, which is repeated cyclically. Weakness and deficiency of this device is a dimensional limitation, as it does not enable pressing and gluing of endless long wooden lamellas into endless long laminated plates. Furthermore, its weakness and deficiency is that the device places wooden lamellas transversely into a laminated plate so that an additional operation and an additional assembly are required to push the prepared laminated plate into the press. Furthermore, its weakness and deficiency is also in the construction of supporting elements, which makes it unsuitable for direct pushing of the lamellas into the press, and at the same time, the operation of supporting elements in the direction of pressing is not synchronized. Furthermore its weakness and deficiency is that it does not enable the use of a fast-drying glue as glue dries already in the phase of putting lamellas together to form a laminated plate. A major weakness and deficiency of this device is also in that it does not enable stopping and adding longer wooden lamellas as decelerations are very high when they stop and, consequently, forces that act on the limiting plate are very large. At the same time, no height guides that would ensure appropriate guidance of curved wooden lamellas are placed along the length of the conveyor belt.

According to the patent document DE 40 41 553 A1, a method and device for continuous gluing of wooden lamellas are known, wherein the wooden lamellas are first arranged on a roller conveyor by which they travel through the glue application device, where glue is applied to one side longitudinal edge of a wooden lamella, whereupon it is transported in the transverse direction in order to make space for the next wooden lamella. The transversely placed wooden lamellas form the later laminated plate of limited width and length, which is then driven by a roller conveyor belt to the pressing table, where it is pressed and glued. This procedure is repeated cyclically. Due to the process in the device that is performed in such a way that lamellas are placed into laminated plates first and then transported to the pressing table and only afterwards they are pushed into the press and glued, it is necessary that the device construction is massive and complex, which is a weakness and deficiency of this solution. Furthermore, its weakness and deficiency is the pressure regulation in air cushions of the upper pushers in the pressing area as the air, due to its compressibility, is not suitable for fast pressure regulation, which increases the gluing time. Furthermore, the device does not enable pressing and gluing of endlessly long wooden lamellas. Because the device puts lamellas into the laminated plate in the transverse direction, an additional operation and an additional assembly are required to push the laminated plate prepared in this way into the press. Another disadvantage is the supporting structure, which is not suitable for direct pressing of lamellas in the press. Also, the device does not enable the use of a fast-drying glue as it dries already during the phase of inserting the lamellas into the laminated plate.

According to the patent document DE 33 17 522 A1, is known a device for inserting wooden lamellas into a press that enables continuous gluing of wooden lamellas into an endlessly long laminated plate. Wooden lamellas enter the device on a roller conveyor in the longitudinal direction and at the end of it they move, by means of a transverse feed unit, to the vertically movable receiving table, which transfers the wooden lamellas to the pressing level, where the upper pushers grab them and push them into the press, wherein they are glued. The procedure is cyclically repeated with overlapping cycles as the roller conveyor and the pushers can function simultaneously. Weakness and deficiency of this device is that it does not enable fast transport of wooden lamellas as it has no suitable pusher rollers or guides that would guide a wooden lamella at high speed. Furthermore, the entry height on the roller conveyor differs from the exit height of the laminated plate, which requires intermediate handling of wooden lamellas. Also, the construction of the supporting element does not enable direct pressing of wooden lamellas in the press.

According to the patent document DE 28 34 288, a device is known for inserting wooden lamellas into the press, where individual wooden lamellas are glued along their thickness and transverse to their longitudinal axis and thereby they form an endless laminated plate. Thereby wooden lamellas enter the device in the longitudinal direction via roller conveyor, afterwards, at the end position, the feed unit moves them transversely to the feed plate, from where the sliding pushers push them into the press, where they are glued into a laminated plate. The procedure is cyclically repeated, with overlapping cycles as the roller conveyor and the sliding pusher can operate simultaneously. Weakness and deficiency of the device is in that the roller conveyor does not comprise the upper pushing rollers or guides that could guide wooden lamellas at high speeds, consequently, a fast transport is not possible. Furthermore, the entry height on the roller conveyor differs from the exit height of the laminated plate. Also, the construction of the supporting element is not suitable for direct pushing of wooden lamellas into the press, which consequently prolongs the time of their gluing. In addition, the sliding pusher does not press the wooden lamellas along their entire thickness, which makes it possible for the surface of wooden lamellas to be damaged as the imprints of the sliding pusher can appear on them.

The previously described known solutions of the devices or presses for pressing and gluing the wooden lamellas into the laminated plates have a common weakness and deficiency that their constructions do not enable a fast and continuous pressing or gluing of the wooden lamellas of optional length and width into the laminated plates also of optional length and width, without post-machining of the surfaces of the laminated plates. Furthermore, their common weakness and deficiency is also that when gluing wooden lamellas of different lengths, they are not adequately pressed to each other along the entire length of the joint and that most of them do not enable the use of fast-drying glues. The previously described weaknesses and deficiencies of the known presses represent an unsolved technical problem that will be solved with an automatic machine for width gluing of wooden lamellas into laminated plates of optional dimensions and a method relating thereto according to the present invention.

SUMMARY AND OBJECT OF THE INVENTION

A technical problem solved by this invention is an automatic machine for gluing of wooden lamellas of optional lengths and widths into laminated plates of optional widths with a press, the construction of which will enable continuous pressing and gluing of wooden lamellas of optional dimensions into plates of optional dimensions, the surface of which will not have to be machined after gluing. Thereby the construction of the press will enable simple, highly efficient and high quality continuous joining and gluing of wooden lamellas at their simultaneous continuous feeding into the press. Furthermore, it will enable fast travelling of wooden lamellas through the press at high speed and their subsequent stopping at high decelerations, with simultaneous rapid and precise positioning of wooden lamellas at intermediate positions and at the end position within the press. This is enabled with the innovative modular construction of the press with several work modules connected into a successive string of optional length, wherein the work modules are seemingly separated by transverse supporting frameworks, whereby the number of work modules defines the length of the press, which can thus be arbitrarily long. Furthermore, the described method of pressing and gluing of wooden lamellas is enabled by innovative constructions of segment pushers with a lifting flap and pressure shoes. The segment pushers enable simultaneous longitudinal transport of wooden lamellas into the press and transverse transport of wooden lamellas to the pressing area of the press where they are formed into laminated plates of optional width. At the same time, the press according to the invention is compact and simple to use, whereas its construction features will enable simple, fast, efficient, high quality and rational method of pressing and gluing of wooden lamellas into laminated plates of optional widths, the surface of which will be of such quality after gluing that they will not need to be further machined.

The automatic machine for width gluing of wooden lamellas into laminated plates of optional dimensions according to the invention consists of a press and a glue application device. The press, with its modular and compact construction, in particular with its supporting framework enables continuous width gluing or joining of wooden lamellas of optional widths and lengths into laminated plates also of optional widths and lengths, the surfaces of which do not have to be additionally machined after the gluing process is finished. Furthermore, the characteristic of the press according to this invention is also that it can operate as an independent transverse conveyor of wooden lamellas in the case when their width joining and gluing into laminated plates is not foreseen. The press according to the invention in this way enables two, previously indicated operation modes.

The construction of the press enables simple, fast and, thus, highly productive joining and gluing of wooden lamellas into laminated plates as it enables several work operations at the same time. Thus, in the press, it is possible to join and glue wooden lamellas, and at the same time, new wooden lamellas can be transported on drive rollers through the press.

The housing of the press consists of several supporting framework segments, separated from each other in a sequential string of optional length, whereby at least one work module is located between two segments and the number of supporting framework segments and intermediate work modules is optional. Such an innovative module construction of the press enables that wooden lamellas of optional dimensions can be joined in the press, which applies also for the glued laminated plates as the end products of this procedure.

Each work module essentially consists of three assemblies, namely of a work table assembly, a pressure shoes assembly and a segment pushers assembly.

The segment pushers assembly consists of an optional number of segment pushers, which are driven via toothed racks by means of servo drives and further consist of corresponding cylinders and lifting flaps. The innovative construction of the segment pusher with a lifting flap enables simultaneous execution of two operations, namely pressing wooden lamellas in the procedure of their transverse transport into the pressing area of the press and simultaneous longitudinal transport of wooden lamellas to the end position within the press. The lifting flaps of segment pushers are constructed in such a way that they are mechanically self-locking at the pressing height in the phase of transverse working movement, i.e. when pressing wooden lamellas. In the phase of return stroke, lifting flaps withdraw from the zone of longitudinal transport of wooden lamellas into and through the press by means of corresponding pneumatic cylinders. In the described feasibility example, the lifting flap rotates via pivot, whereas in some other feasibility example, it can be executed in some other way, e.g. for horizontal lifting or the like.

The transport of wooden lamellas to their end position within the press is carried out on drive rollers, located under non-driven pressure rollers, which enable wooden lamellas to stop with large decelerations. The drive rollers with a servo drive and non-driven pressure rollers positioned in this way enable fast and precise positioning of wooden lamellas in their end position in the press.

The pressure shoes assembly is formed by the long and the short pressure shoes, positioned alternately in a successive set, an innovative construction of which enables regulation or reduction of the pressure force in the phase of pressing or width joining of wooden lamellas. The latter is the consequence of clamping the supporting bar and the guiding bar of a pressure shoe at five points. This means that regulation or reduction of the pressure force depends on the angle of placing the supporting bar.

The innovative construction of the long and short pressure shoes enables that, in the phase of standstill, these pressure shoes push wooden lamellas with a nominal force and in this way they maintain the pressure required in the glue joint. In the phase of pressing or gluing wooden lamellas, the pressure shoes, due to the previously mentioned reduction force, press the observed wooden lamella with a reduced nominal force. Consequently, the force required for gluing or pressing wooden lamellas in the pressing area of the press is reduced.

The function of the longer pressure shoes is to align wooden lamellas in the height and length just before width joining, whereby a high quality glue joint along the entire length of wooden lamellas is ensured and, at the same time, it is ensured that laminated plates are straight after width joining.

The work table assembly includes one or more endless chains with pusher dogs, non-driven pressure rollers and drive rollers with a servo drive. In the present feasibility example of the invention, the endless chains are equipped with two pusher dogs and enable fast removal of laminated plates from the press and, at the same time, also holding of wooden lamellas during start-up or initial feeding of the press with wooden lamellas. Based on above, it applies that the pusher dogs enable two-way operation as in the phase of starting the press, they hold and position the wooden lamellas at constant force by means of the servo drive. As mentioned, two pusher dogs are positioned on the endless chain, the distance between them is optional, which makes it possible to re-feed the press with new wooden lamellas at the same time as the already joined and glued laminated plate is being removed from the press.

In the phase of pressing and gluing or joining wooden lamellas into laminated plates, the wooden lamella, the longitudinal edges of which were previously coated with glue in the glue application device, is longitudinally transported into the press and afterwards it is pushed, in the transverse direction, with segment pushers to the last wooden lamella in the previously partially glued laminated plate. This pressure must last as long as the glue on the last wooden lamella is dry. For a high quality joint, in the glue-drying phase, a constant pressure in the glue joint is required, which is ensured by the pressure of segment pushers. To ensure a constant pressure in the glue joint and thus to prevent the wooden lamellas from spacing apart, the laminated plate is pressed within the pressing area with long and short pressure shoes. In the pressing area, the wooden lamellas glued into a laminated plate are kept as long as glue is not adequately dry.

With such a method of gluing of wooden lamellas into laminated plates, the force produced by pressure shoes when pressing in the pressing area must be appropriately reduced. After pressing of wooden lamellas is concluded, the force of the pressure shoes must be increased back to its nominal value in order to retain the appropriate pressure in the glue joint. The innovative execution of the construction of the pressure shoes enables automatic and independent regulation of the force when pressing wooden lamellas into the pressing area of the press.

The press according to the invention enables operation in two ways, the primary and the secondary. The primary or the main function of the press is continuous gluing of wooden lamellas of optional widths and lengths into laminated plates of optional widths and lengths, without subsequent machining of the surface of laminated plates. The secondary or the auxiliary function of the press is its operation in terms of the transverse conveyor of wooden lamellas when it is not required to glue the wooden lamellas into laminated plates.

The primary function of pressing, gluing and joining of wooden lamellas essentially consists of three steps of operation of the press according to the invention. The first step represents the beginning of feeding the press with the first lamella, this is followed by the second step of gluing the second and all other wooden lamellas into laminated plates and the third step of emptying the press.

The start of feeding the press is carried out by transporting the first wooden lamella via glue application device into the press, whereby glue is not applied to the first lamella. The longitudinal transport of the wooden lamella that arrived to the press is carried out on drive rollers with a servo drive that are located in the work table assembly within individual work modules. The stopping of a wooden lamella at the working position takes place with large decelerations, which is enabled by non-driven pressure rollers that are located above the drive rollers and are placed on the work table assembly. Non-driven pressure rollers push the wooden lamella by means of a cylinder and in this way they ensure suitable friction between drive rollers and the wooden lamella. In the previously described way, the wooden lamella is stopped at the working position with the precision of +−1 mm. The non-driven pressure rollers operate cyclically, so they apply pressure on the wooden lamella only when it is situated below them. The non-driven pressure rollers put the previously described pressure on the wooden lamella as long as it does not reach the pressing area. The entry of the wooden lamella into the pressing area is possible when the pusher shoes are in the standstill position. When the wooden lamella enters the pressing area with 60% of its width, the non-driven pressure rollers return to their initial, i.e. standstill position. In parallel, depending on the width of the wooden lamella, endless chains with pusher dogs are positioned.

After the first wooden lamella is stopped at the end position, the segment pushers push it, via toothed rack, under the pressure shoes, at the same time the wooden lamella comes in contact with the pusher dogs. In case of a curvature of a wooden lamella, the pusher dogs by means of the servo drive straighten a curvature. This is followed by the pressure of the pressure shoes on the wooden lamella, whereby their scissor-like mechanism enables that they remain horizontally aligned. The pressure of long and short pressure shoes on the wooden lamella enables that it retains its aligned form despite the possible curvature, which is the consequence of friction between the observed lamella and the pressure shoes.

This is followed by the lifting of the lifting flap on the segment pusher by means of a cylinder, whereby the lifting flap withdraws from the transport area at the same time as the movement of the segment pusher to the start position. Simultaneously, the transport of the second wooden lamella starts through the glue application device into the press, which represents the beginning of a new cycle. When the second and all other wooden lamellas are transported through the glue application device, glue is applied to the contact surfaces of wooden lamellas. The cycle of the previously described initial feeding of the press is finished when the segment pushers return to their start position and their lifting flaps lower to the pressing height.

Holding with pusher dogs is also carried out on the next lamellas, until the pressing area is 80% full in the zone under the long and short pressure shoes, after which the pusher dogs are withdrawn to the position of standstill.

The function of the pusher dogs is to hold wooden lamellas in the phase of feeding the pressing area of the press and when glued laminated plates are transversely transported in the phase of emptying the pressing area.

The second phase of gluing consists of a normal cycle of gluing wooden lamellas to a laminated plate and it starts when glue is applied to the second wooden lamella in the glue application device, the second wooden lamella is then positioned to its end position with the already described method. During the transport of the wooden lamella into the press, the non-driven pressure rollers press it in cycles. When the observed second and each next wooden lamella is stopped at its end position, the segment pushers push it to the pressing area by means of a toothed rack and they press and glue it to the existing or previous wooden lamella or to the laminated plate if it is already formed. As previously mentioned, the non-driven pressure rollers are putting pressure to the observed wooden lamella until it enters the pressing area and then they return to the start or to the standstill position, when the wooden lamella, with its width of 60%, enters the pressing area. After the wooden lamellas are pressed in the pressing area of the press, the return movement of the segment pusher to its start position follows, and at the same time the lifting flap lifts and then withdraws from the transport area. The cycle of gluing wooden lamellas is finished when the segment pushers return to their start position and the lifting flap lowers to the pressing height. Simultaneously, with the return movement the segment pushers, the longitudinal transport of a new or the next wooden lamella into or through the press starts.

During the transport of the first wooden lamella through the glue application device, the glue is not applied on it, which has already been mentioned previously. During the transport of the second and of all the next wooden lamellas, glue is applied to joining surfaces of wooden lamellas, which applies also for the last wooden lamella in the glued laminated plate before its departure from the press. In some other feasibility example, e.g. when gluing a smaller number of wooden lamellas, glue application can be performed only for every second or optional wooden lamella. In this way, the press enables continuous joining of laminated plates in their duo, trio or similar execution.

When the last wooden lamella is pressed into the pressing area, the return movement of the segment pushers to their start position follows, at the same time, the lifting flap is lifted and the lifting flap withdraws from the transport area. Afterwards the long and short pressure shoes lift to their standstill position and the glued laminated plate is transported from the pressing area of the press by means of pusher dogs.

The press is emptied after gluing of wooden lamellas into laminated plates is finished, primarily, due to changing the length and/or thickness of input wooden lamellas. This does not apply if the width of the wooden lamellas is changed, in such a case the press can continue the continuous gluing of wooden lamellas.

As previously mentioned, the machine or press according to the invention can perform a secondary function in the terms of the operating of a transverse conveyor, when gluing or width joining of wooden lamellas is not performed. Also when operating in this mode, the wooden lamella is transported longitudinally to the press via the glue application device, with the difference that the glue is not applied. Wooden lamellas are transported from the glue application device to the press by means of non-driven and cyclically operating pressure rollers, which return to their start, i.e. standstill position after the positioning is finished. The positioning of wooden lamellas to their end position is performed according to the method previously described for in the primary function of the press. This is followed by transverse transport of wooden lamellas from the press by means of the pusher dogs on the endless chains. Thereby the use of the segment pushers is not necessary.

The novelty of the present invention is in the module construction of the press housing with the intermediate work modules of the machining units, which enables continuous width gluing of wooden lamellas of optional dimensions into laminated plates also of optional dimensions, and also in the method of pressing and gluing laminated plates. The invention will be more precisely described in the preferential feasibility example, which follows.

The various features of novelty, which characterize the invention, are pointed out with particularity in the claims annexed to and forming a part of this disclosure. For a better understanding of the invention, its operating advantages and specific objects attained by its uses, reference is made to the accompanying drawings and descriptive matter in which a preferential feasibility example of the invention is illustrated.

Figure 1:
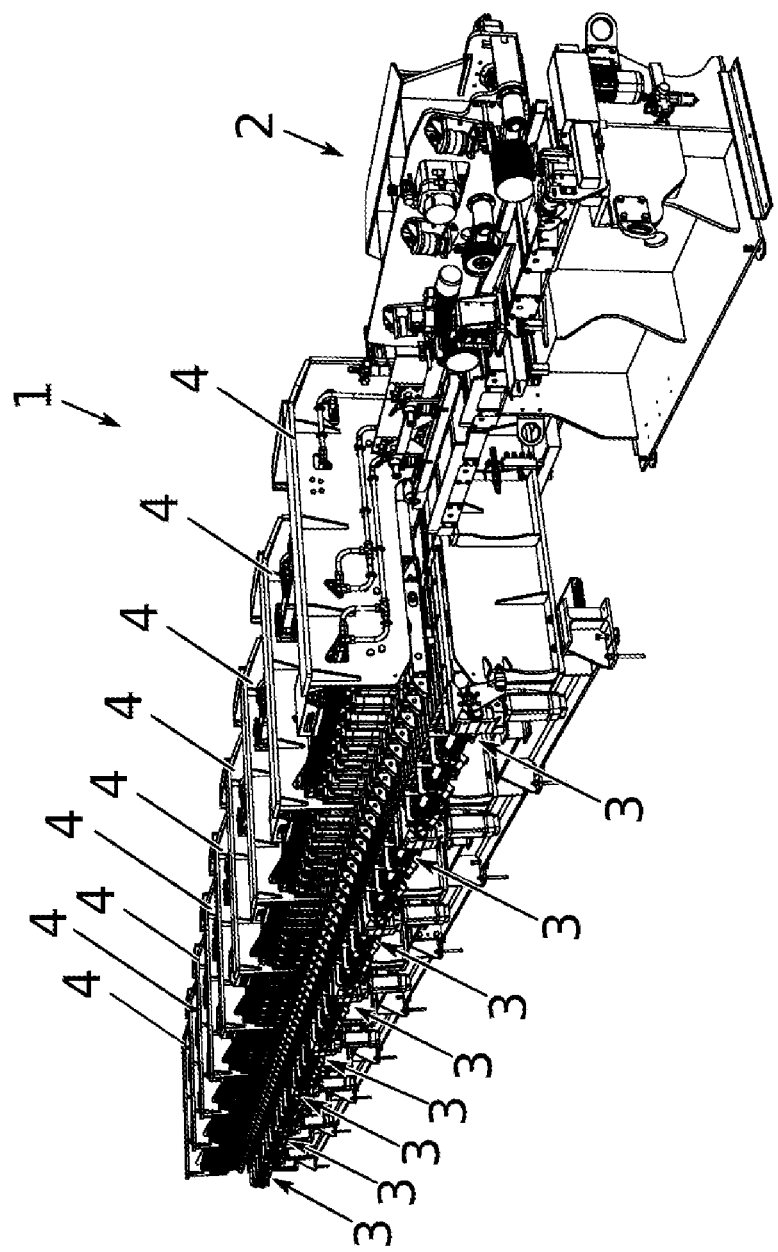
FIG. 1 automatic machine for width gluing of wooden lamellas into laminated plates of optional dimensions according to the invention, isometric projection.

Thereby, the reference numerals and the letters in the Figures indicate as follows:

1. press
 2. glue application device
 3. work module
 4. supporting framework segment
 5. work table assembly
 6. pressure shoes assembly
 7. segment pushers assembly
 8. segment pusher
 9. long pressure shoe
 10. short pressure shoe
 11. servo drive
 12. pusher dog
 13. endless chain
 14. servo drive
 15. cylinder
 16. linear guide
 17. cylinder
 18. lifting flap
 19. cut-out
 20. supporting bar
 21. guide bar
 22. pressure element
 23. carrying element
 24. runner block
 25. toothed rack
 26. wooden lamella
 27. laminated plate
 28. non-driven pressure roller
 29. drive roller
 30. framework
 31. carrying element
 32. guide
 33. pivot 34. guide groove
35. drive shaft
36. framework
37. servo drive
38. sprocket
39. pivot
40. slide plate
41. track roller bearing
42. pivot
43. contact surface
F—direction of movement of the pressure element 22;
G—direction of movement of the track roller bearing 41;
H—rotary movement of the supporting bar 20 in pivot 33;
P—direction of rotary movement of the lifting flap 18;
J—direction of the force acting on the pressure element 22;
K—direction of the force acting on the pressure element 22;
R—direction of action of the pressure force of the lifting flap 18 on the wooden lamella 26 in a laminated plate 27;
M—direction of action of friction force on the pressure element 22;
N—direction of action of friction force on the slide plate 40.

DESCRIPTION OF THE PREFERENTIAL FEASIBILITY EXAMPLE

The main characteristic of the present invention is a solution of the previously described technical problem with an innovative construction of a machine for width gluing of wooden lamellas into laminated plates of optional dimensions, particularly of its press 1 for continuous pressing or joining and gluing of wooden lamellas 26 of optional dimensions into laminated plates 27 also of optional dimensions. The latter represents the primary function of the press 1, whereas its secondary function is represented by a merely transverse transport of wooden lamellas 26.

Figure 2:
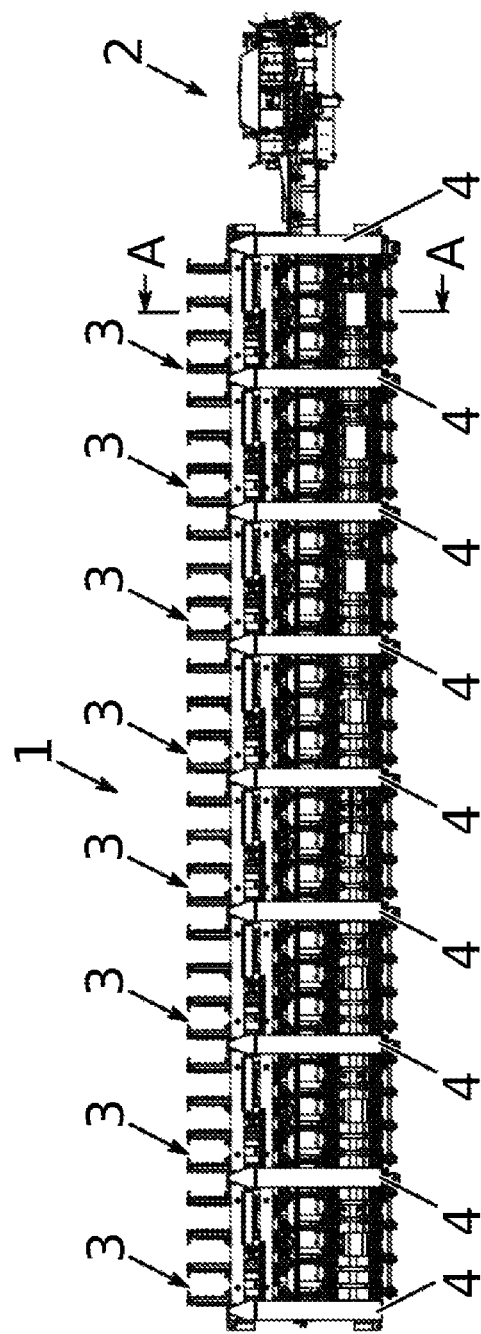
FIG. 2 the same as in FIG. 1, only in a plan view.

Turning now to the drawings, and referring first to the FIG. 1 and FIG. 2, the automatic machine for width gluing of wooden lamellas into laminated plates of optional dimensions according to the invention consists of a press 1 and a glue application device 2 at its entry. The press 1 consists of work modules 3 positioned in a set and fixed to a corresponding supporting framework segments 4, which are passable connected to each other and only seemingly separated. The module construction of the press 1 enables its execution with an optional number of work modules 3 and a corresponding number of the intermediate supporting framework segments 4, which can be easily either added or removed if necessary.

Figure 3:
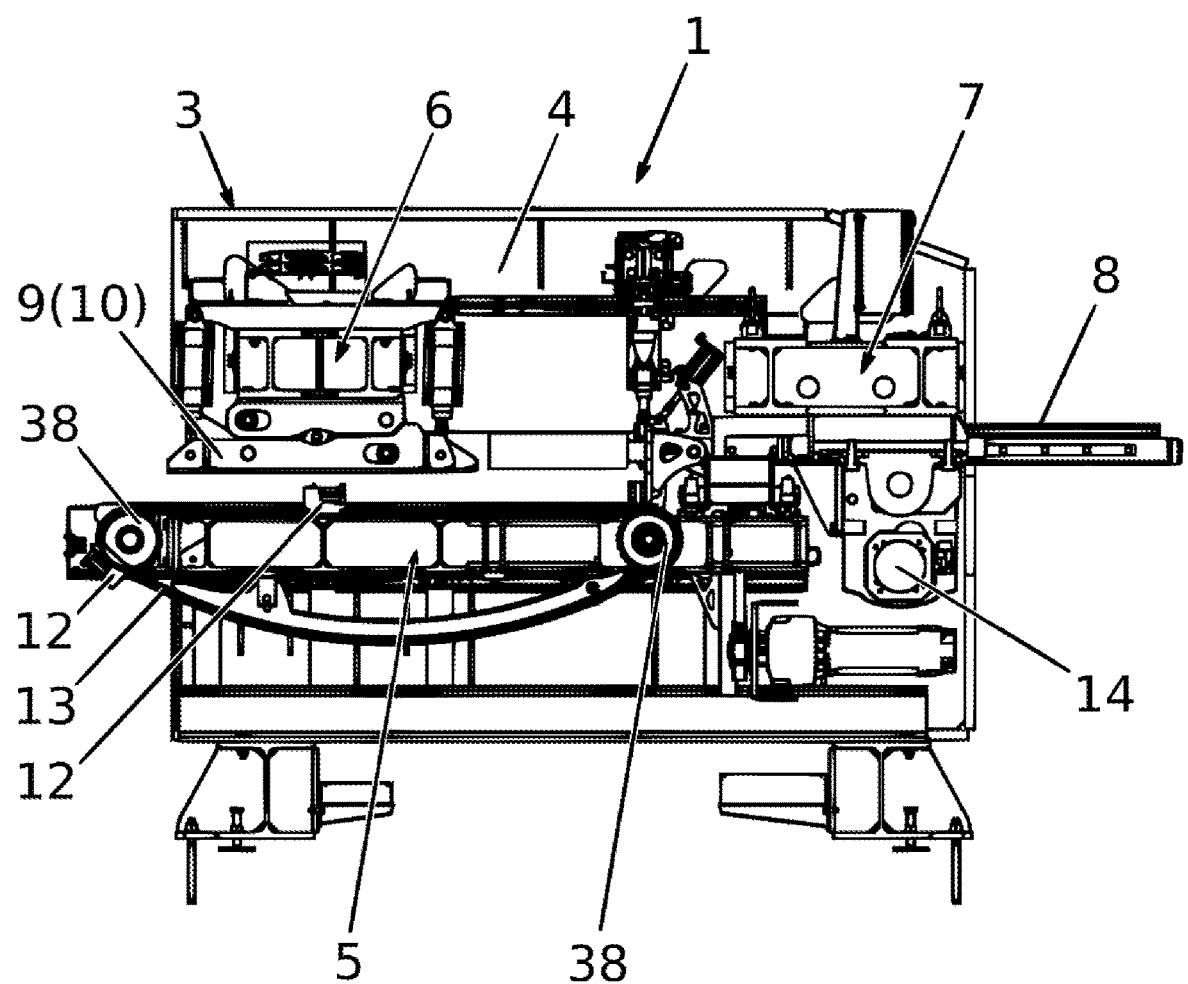
FIG. 3 the same as in FIG. 1, only in cross-section A-A.
Figure 4:
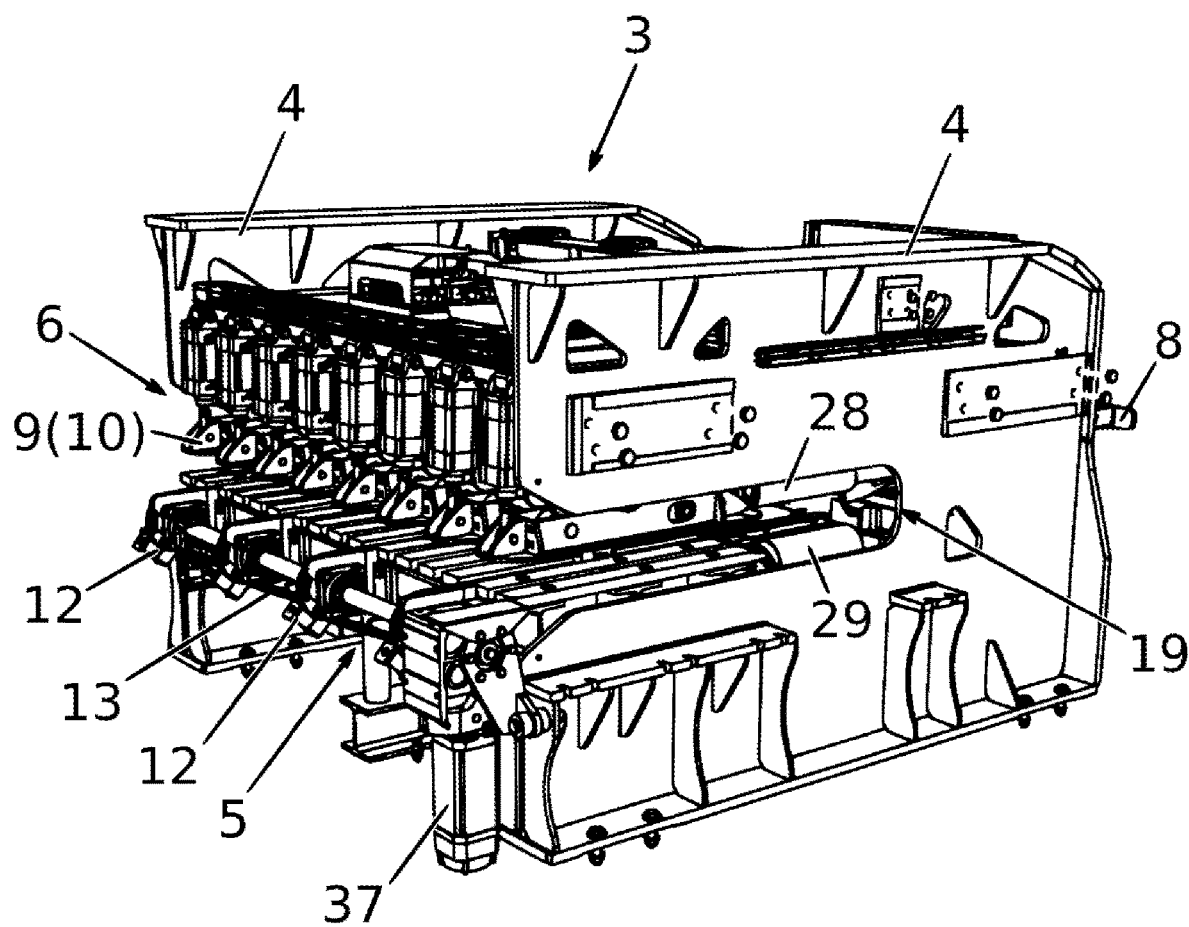
FIG. 4 press module in isometric projection, front view.
Figure 5:
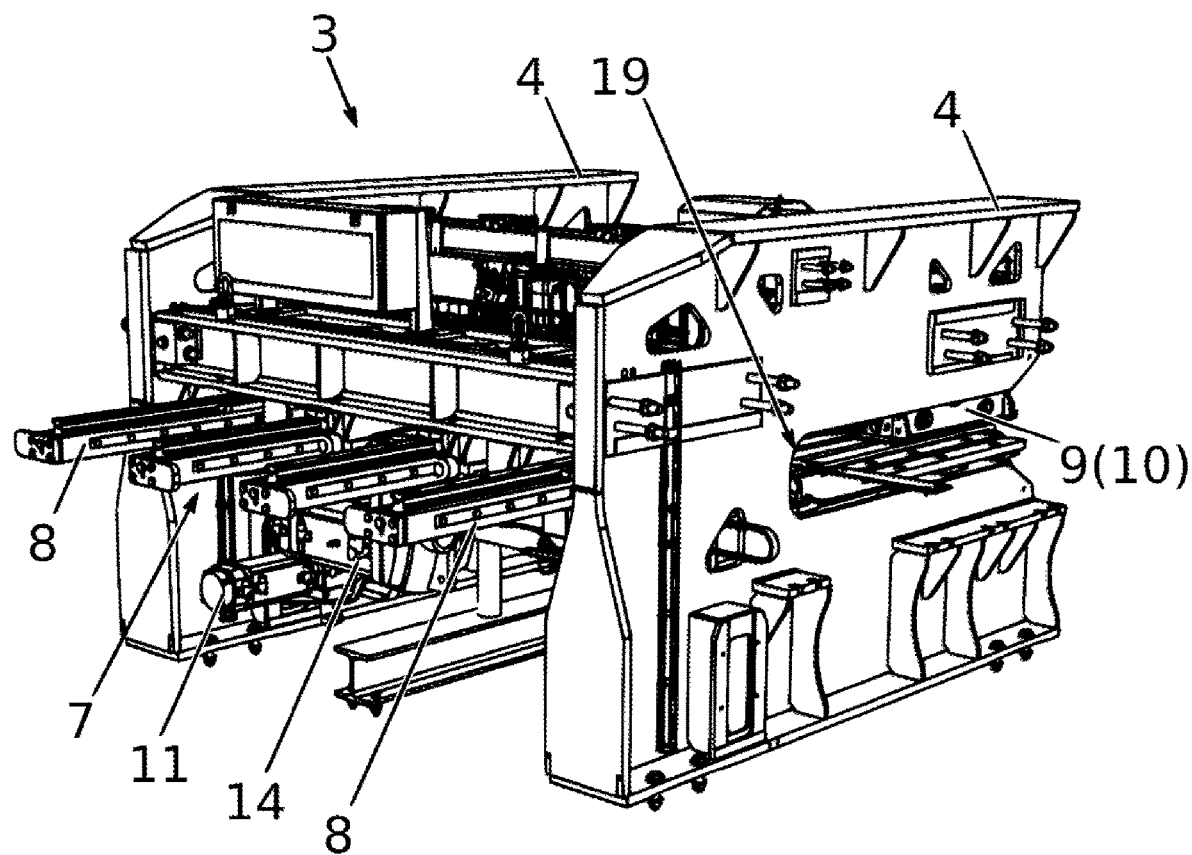
FIG. 5 the same as in FIG. 4, only back view.

It is evident from FIG. 3, FIG. 4 and FIG. 5 that every single work module 3 consists of a work table assembly 5, pressure shoes assembly 6 and segment pushers assembly 7 with a servo drive 14, which are surrounded, at both flank sides, by at least one supporting framework segment 4, to which they are attached. The pressure shoes assembly 6 consists of long pressure shoes 9 and short pressure shoes 10, which are positioned alternately, and it is positioned on the front side of the press 1 or the work module 3 and located above the work table assembly 5, which in the present feasibility example consists of four endless chains 13 with at least two pusher dogs 12, clamped between the corresponding pair of sprockets 38. The segment pushers assembly 7 is positioned at the back side of the work module 3 of the press 1 and it consists of segment pushers 8 and a servo drive 14. The number of endless chains 13 with pusher dogs 12 within the work table assembly 5 can be optional, which applies also for the number of long pressure shoes 9 and short pressure shoes 10 within the pressure shoes assembly 6 and also for the number of segment pushers 8 within the segment pushers assembly 7. Thereby it applies that at least one segment pusher 8 belongs to each pair of the long pressure shoe 9 and the short pressure shoe 10.

The non-driven pressure rollers 28 and the drive rollers 29 are located between the work table assembly 5, the pressure shoes assembly 6 and the segment pushers assembly 7. The longitudinal axes of the set of the non-driven pressure rollers 28 and the set of the drive rollers 29 are parallel to each other, whereby the pressure rollers 28 are located above the drive rollers 29 at a defined distance from each other. Within the work module 3 the drive rollers 29 are equipped with a servo drive 11 for positioning wooden lamellas 26 at the end position within the press 1.

Into each supporting framework segment 4, at least one elongated cut-out 19 is carried out, which is one-sidedly open in the direction of the front side of the press 1. The elongated cut-outs 19 in the supporting framework segments 4 are preferentially of the same dimensions and forms and they enable passing through, i.e. free transport of wooden lamellas 26 between work modules 3 and thereby their flow along the entire press 1 length. For this purpose, the pressure shoes 9 and 10, rollers 28 and 29 and endless chains 13 with pusher dogs 12 are positioned within the area of the elongated cut-outs 19. The described is shown in FIG. 4.

Figure 6:
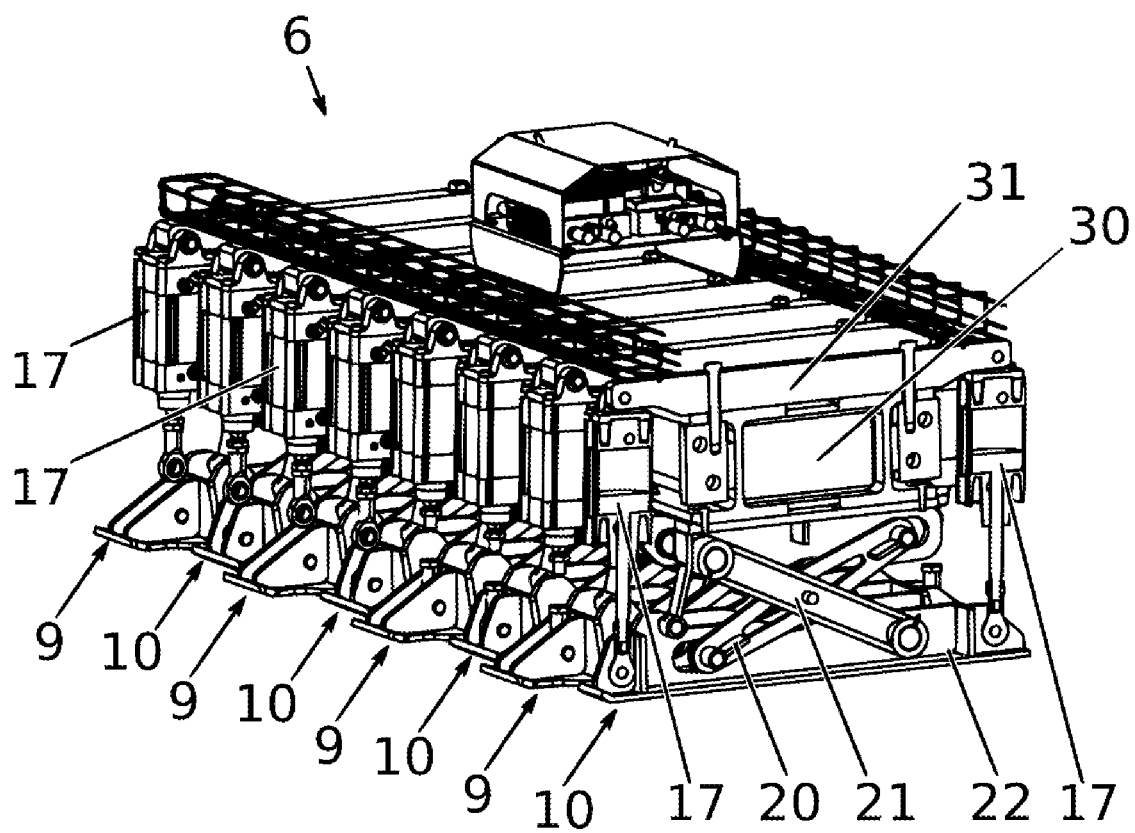
FIG. 6 pressure shoes assembly in isometric projection.

It is evident from FIG. 6 that the pressure shoes assembly 6 consists of a framework 30 to which the carrying elements 31 are fixed successively. At both ends of each carrying element 31, one cylinder 17 is fixed, both cylinders 17 are connected with the corresponding long pressure shoe 9 or the short pressure shoe 10. A set of cylinders 17 is located above the set of long pressure shoes 9 and short pressure shoes 10, which are placed alternately next to each other in the observed set. Furthermore, it is evident that each pressure shoe 9 and 10 includes a pressure element 22, and a supporting bar 20 and a guide bar 21, which are interconnected with a scissor-like connection and which are movably connected with the pressure element 22.

Figure 7:
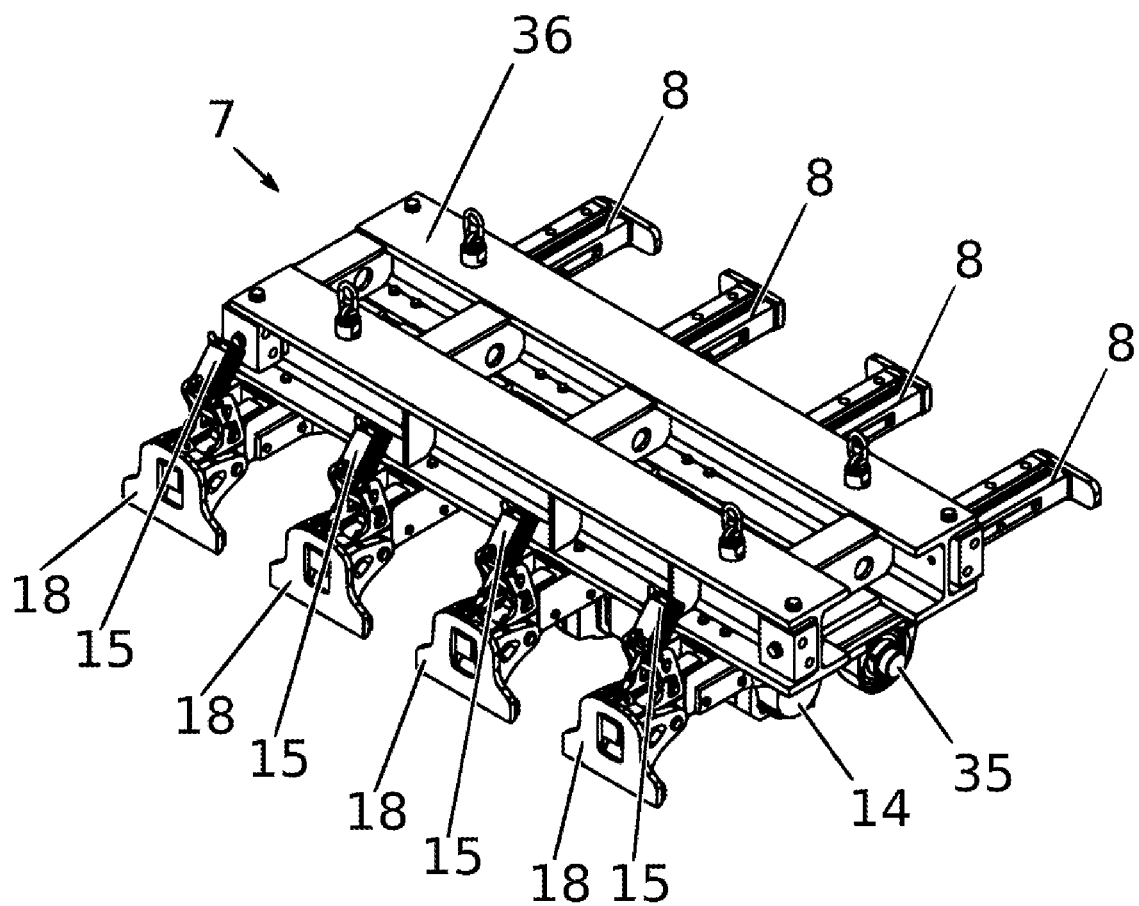
FIG. 7 segment pushers assembly in isometric projection.

It is shown in FIG. 7 that the segment pushers assembly 7 consists of the framework 36, to which a set of segment pushers 8 is fixed from the bottom side, the segment pushers 8 are connected with the drive shaft 35 with the servo drive 14 via toothed rack 25. Each segment pusher 8 has a lifting flap 18 positioned at one free end, whereby the lifting flap 18 is movably connected with the corresponding cylinder 15.

Figure 8:
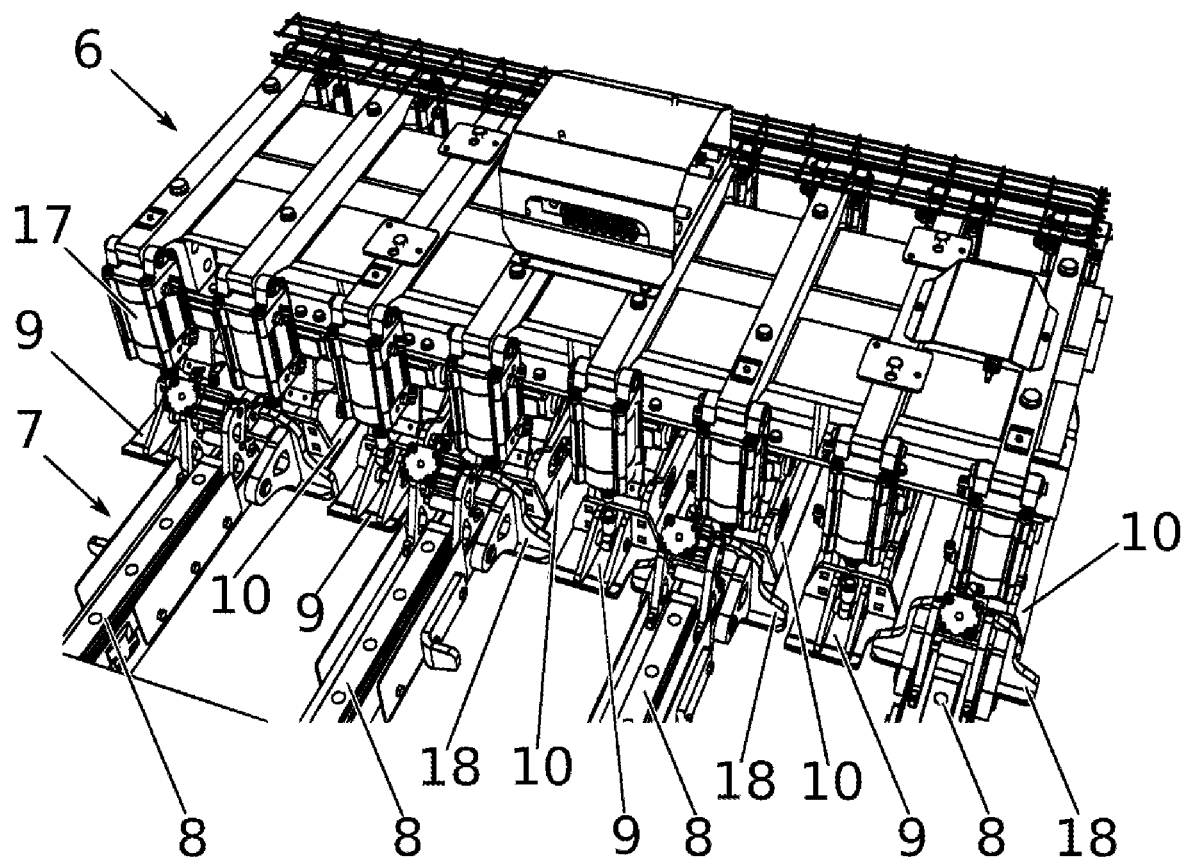
FIG. 8 segment pushers assembly and pressure shoes assembly in mutual matching.

FIG. 8 shows mutual matching of the pressure shoes assembly 6 and the segment pushers assembly 7. The segment pushers 8 are located between the long pressure shoes 9 and the short pressure shoes 10 so that they lie right next to the short pressure shoes 10.

Figure 9:
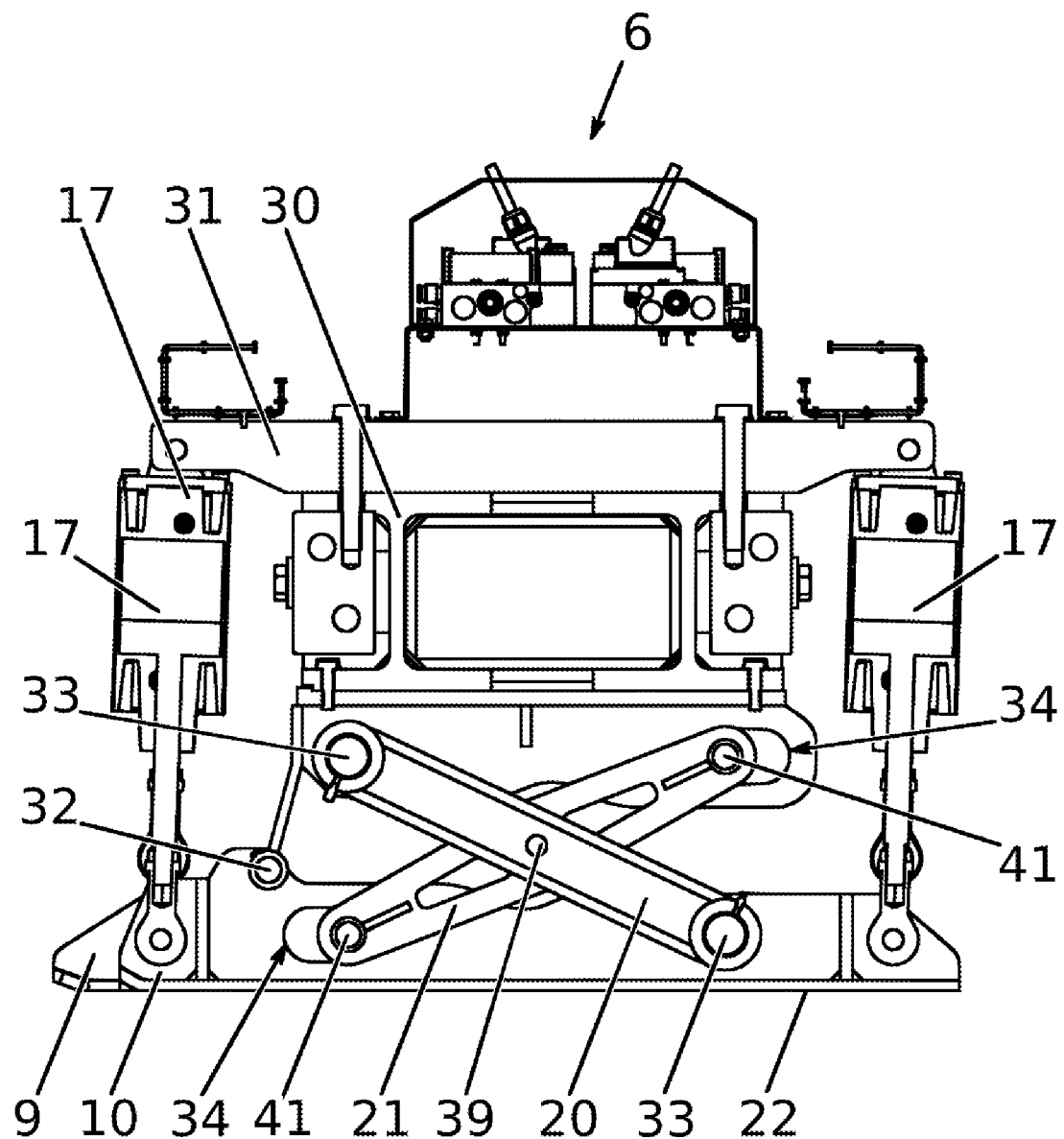
FIG. 9 pressure shoes assembly, in front view.
Figure 10:
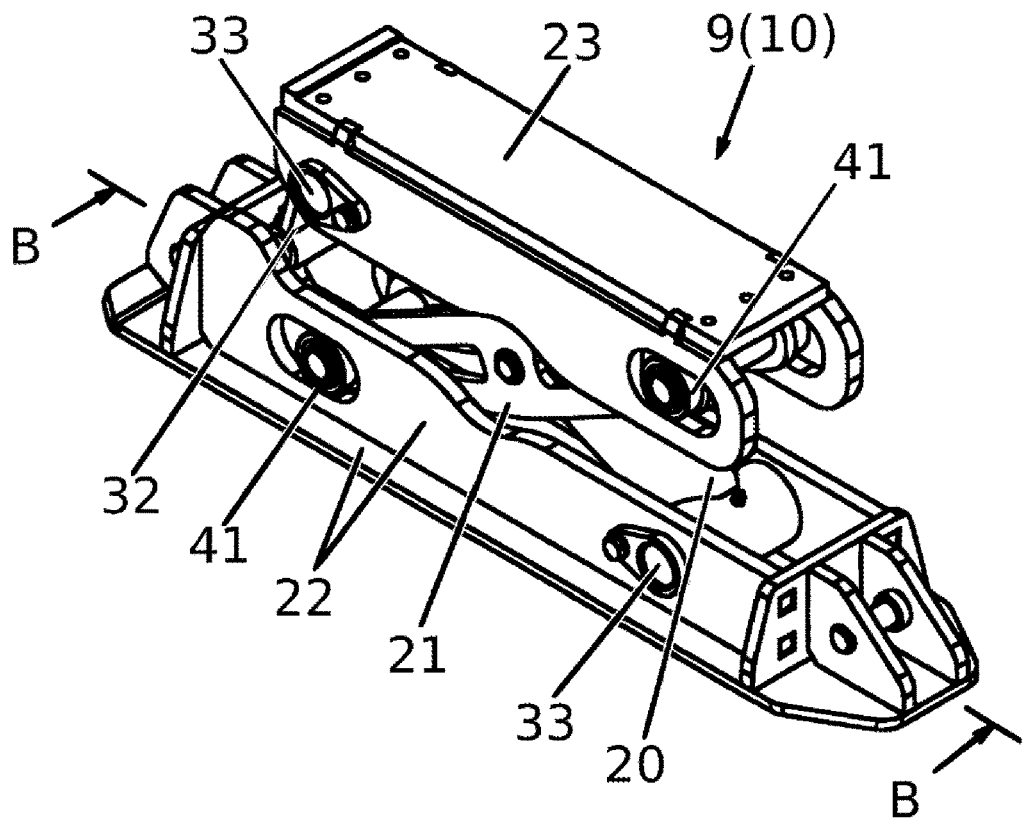
FIG. 10 pressure shoe in isometric projection.
Figure 19:
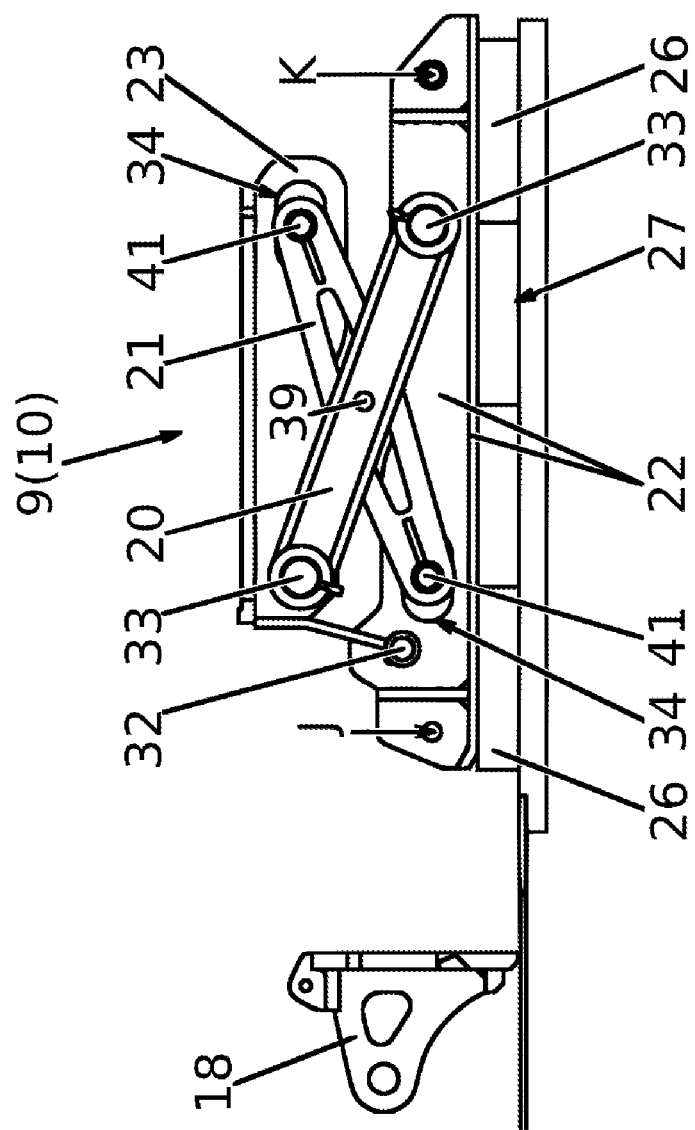
FIG. 19 schematic presentation of forces operation on a pressure shoe being exerting pressure on a laminated plate.
Figure 20:
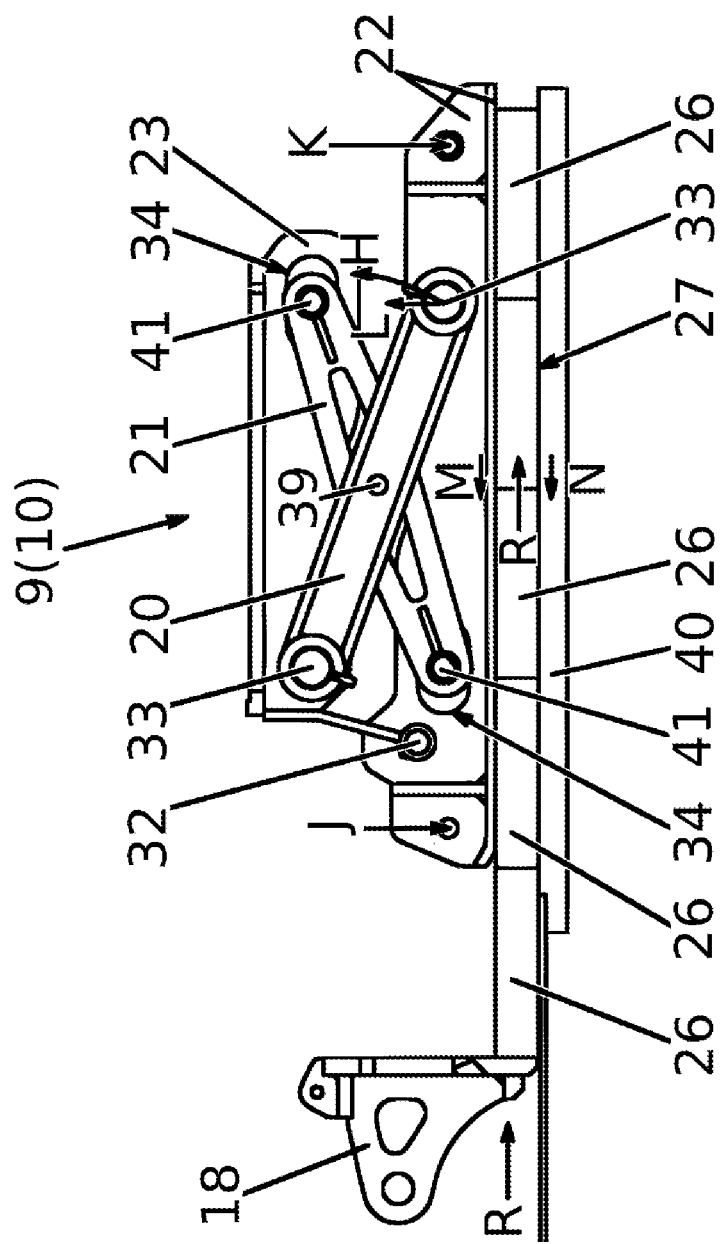
FIG. 20 schematic presentation of forces operation on a pressure shoe during width joining of wooden lamellas into a laminated plate.

FIG. 9 and FIG. 10 show that the pressure shoes assembly 6 consists of the framework 30, carrying elements 31, cylinders 17 and an alternating set of long pressure shoes 9 and short pressure shoes 10. The carrying elements 31 are fixed to the framework 30, whereby cylinders 17 are attached to both ends of an individual carrying element 31. With the opposite end, the cylinders 17 are movably attached to the pressure element 22 of the long pressure shoe 9 or the short pressure shoe 10. Each individual long pressure shoe 9 or short pressure shoe 10 consists of a flat pressure element 22 with a guide 32, carrying element 23, supporting bar 20 and guide bar 21. The latter two are in mutual scissor-like grip via common pivot 39, whereby the supporting bar 20 is movably clamped at both ends also to the corresponding pivots 33. At both ends of the guide bar 21, there are positioned the track roller bearings 41, which are inserted each into its corresponding guide groove 34, wherein the lower lying guide groove 34 is formed on the pressure element 22 and the higher guide groove 34 is carried out on the framework 30. The described is shown in FIG. 19 and FIG. 20.

Figure 17:
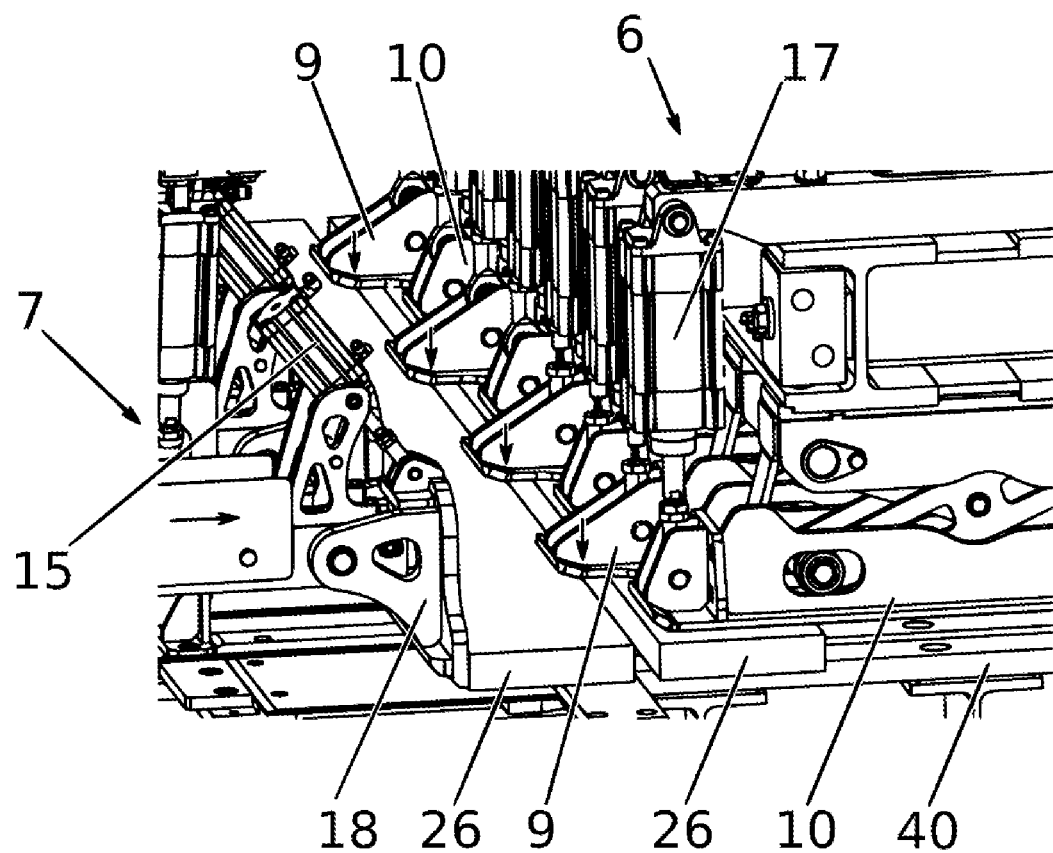
FIG. 17 presentation of aligning of a wooden lamella with long pressure shoes, before the beginning of width joining.
Figure 18:
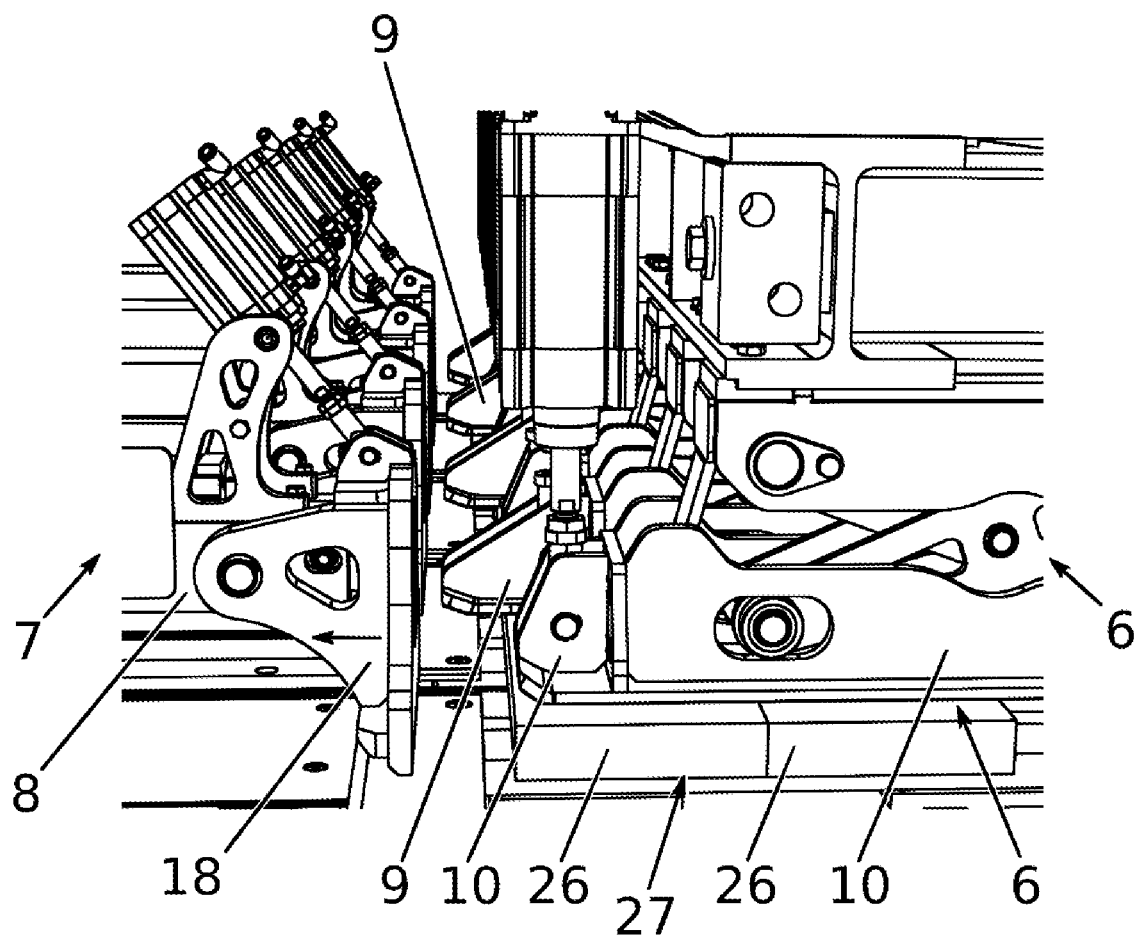
FIG. 18 presentation of withdrawing of the lifting flaps with segment pushers after finished width joining.

The described innovative construction of the long pressure shoes 9 and short pressure shoes 10 enables regulation or reduction of the pressure force during the pressing phase, or during width joining and gluing of wooden lamellas 26, which is the consequence of the previously described five-point clamping of the supporting bar 20 and the guide bar 21. In this way, the regulation or the reduction of the pressure force depends on the angle of positioning the supporting bar 20. In the standstill phase, the pressure shoes 9 and 10 press the observed wooden lamella 26 with nominal force and thereby, the pressure required in the glued joint between wooden lamellas 26 is kept. Later, in the phase of pressing and gluing of wooden lamellas 26, the long pressure shoes 9, due to limited reduction force, press the observed wooden lamella 26 with reduced nominal force. Consequently, the force required for pushing wooden lamellas 26 into the pressing area of the press 1 is reduced. The task of the longer pressure shoes 9 is also to align each wooden lamella 26 along its height and length before the procedure of width joining and gluing, which enables high quality glued joints along the entire length of wooden lamellas 26, which is a condition that the laminated plates 27 are perfectly straight after pressing and gluing. The described is shown in FIG. 17 and FIG. 18.

The required versatile movability of pressure shoes 9 and 10 when aligning wooden lamellas 26 before pressing and gluing them into a laminated plate 27 is provided by cylinders 17 and the scissor-connected supporting bar 20 and guide bar 21, all of which ensure the required movement and pressure action of the pressure elements 22 on the observed wooden lamella 26 in all directions.

Figure 11:
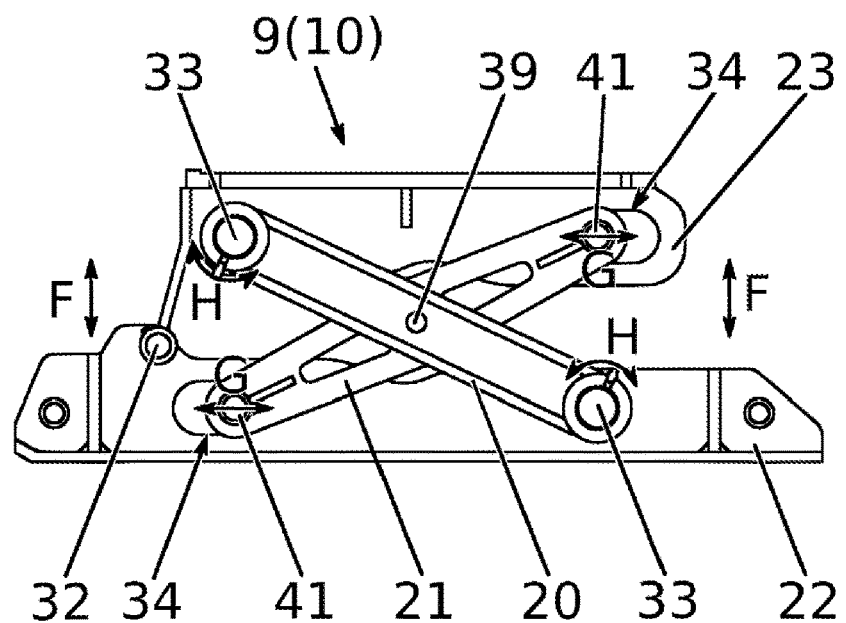
FIG. 11 pressure shoe in longitudinal cross-section B-B.

FIG. 11 shows free rotations and translations of the previously described components of the long pressure shoes 9 and the short pressure shoes 10. Thus, the pivot 33 enables rotation of the supporting bar 20 in the direction H. The movement of track roller bearings 41 is limited within the guide grooves 34, which means that the translation of both track roller bearings 41 is limited in the direction G. The supporting bar 20 and the guide bar 21, which are connected in the pivot 39, together enable vertical movement of the pressure element 22 in the direction F. The guide 32 ensures the alignment of the pressure element 22 if compared with the carrying element 23.

Figure 12:
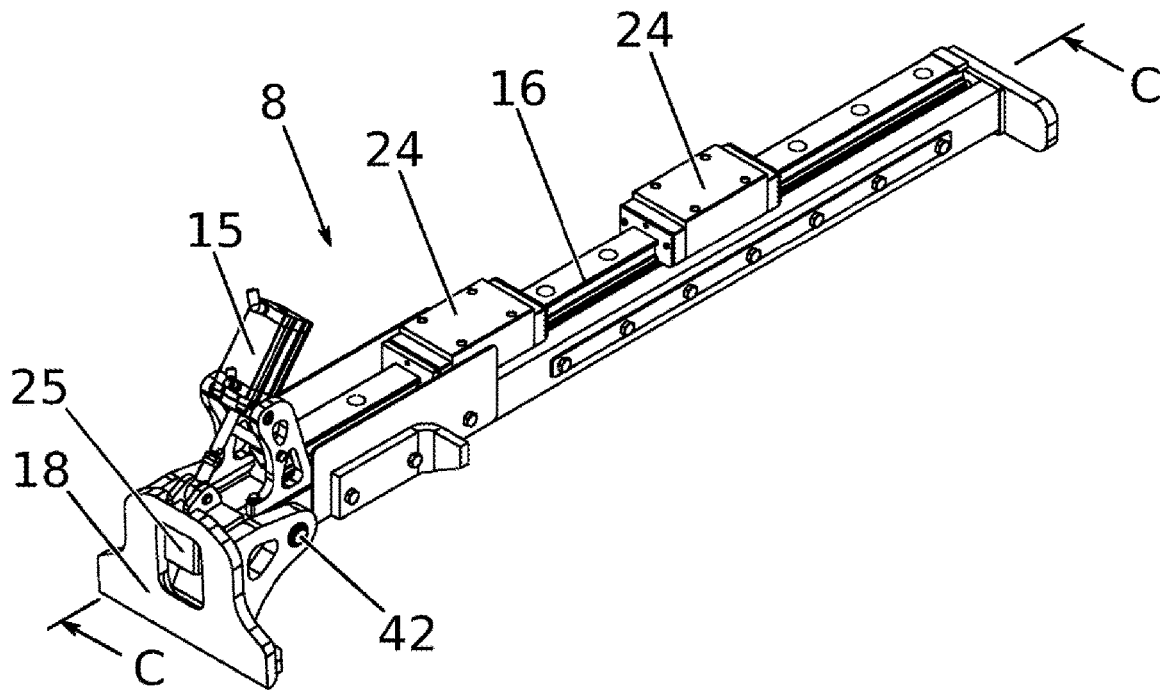
FIG. 12 segment pusher in isometric projection.
Figure 13:
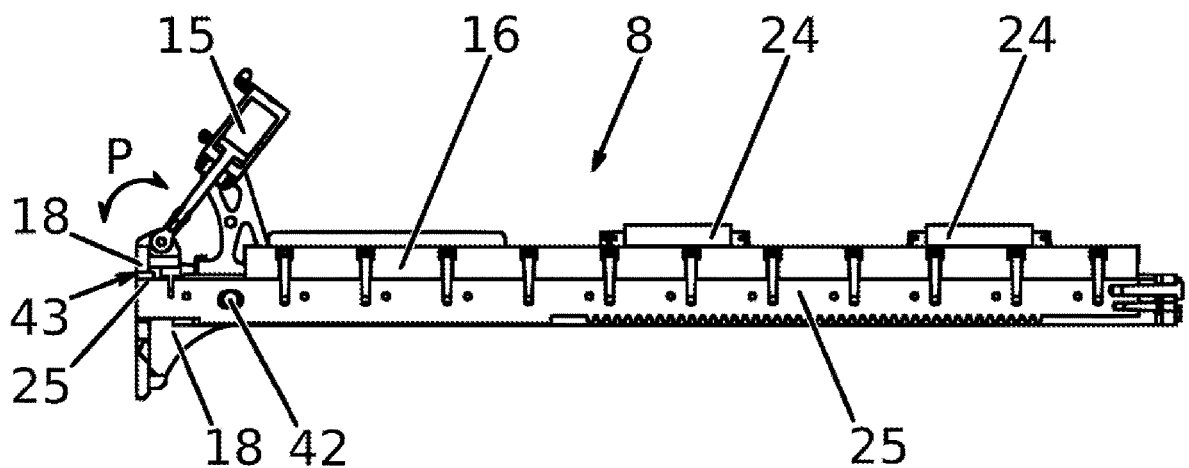
FIG. 13 segment pusher in longitudinal cross-section C-C.

It is evident from FIG. 12 and FIG. 13 that each segment pusher 8 within the segment pushers assembly 7 consists of two runner blocks 24, which move along a linear guide 16 and furthermore it consists of a cylinder 15 and a lifting flap 18, which are movably connected with each other and placed on the front side of the segment pusher 8. As previously mentioned, two runner blocks 24 are positioned movably and spaced apart on the linear guide 16, whereas a toothed rack 25 is fixed to the linear guide 16. The cylinder 15 lifts and lowers the lifting flap 18 so that it rotates in the direction P round the pivot 42. The lifting flap 18 has the characteristic that it is mechanically self-locking at the pressing height and its position is blocked at the contact surface 43 on the toothed rack 25. The movement of the lifting flap 18 is limited with the movement of the cylinder 15. In the presented feasibility example the lifting flap 18 rotates via pivot 42, whereas in some other feasibility example it can also be carried out in another way, for example horizontally lifting or the like.

The innovative construction of the segment pushers 8 with the lifting flap 18 enables simultaneous execution of two operations, namely the pressing of a wooden lamella 26 and its transverse transport into the pressing area of the press 1 and simultaneous longitudinal transport of the observed wooden lamella 26 to the end position within the press 1. As already mentioned, the lifting flap 18 is constructed so that, in the phase of pressing of the wooden lamella 26, which represents its stroke, it is mechanically self-locking at the pressing height. In the return stroke, by means of the pneumatic cylinder 15, the lifting flap 18 withdraws from the longitudinal transport area.

Figure 14:
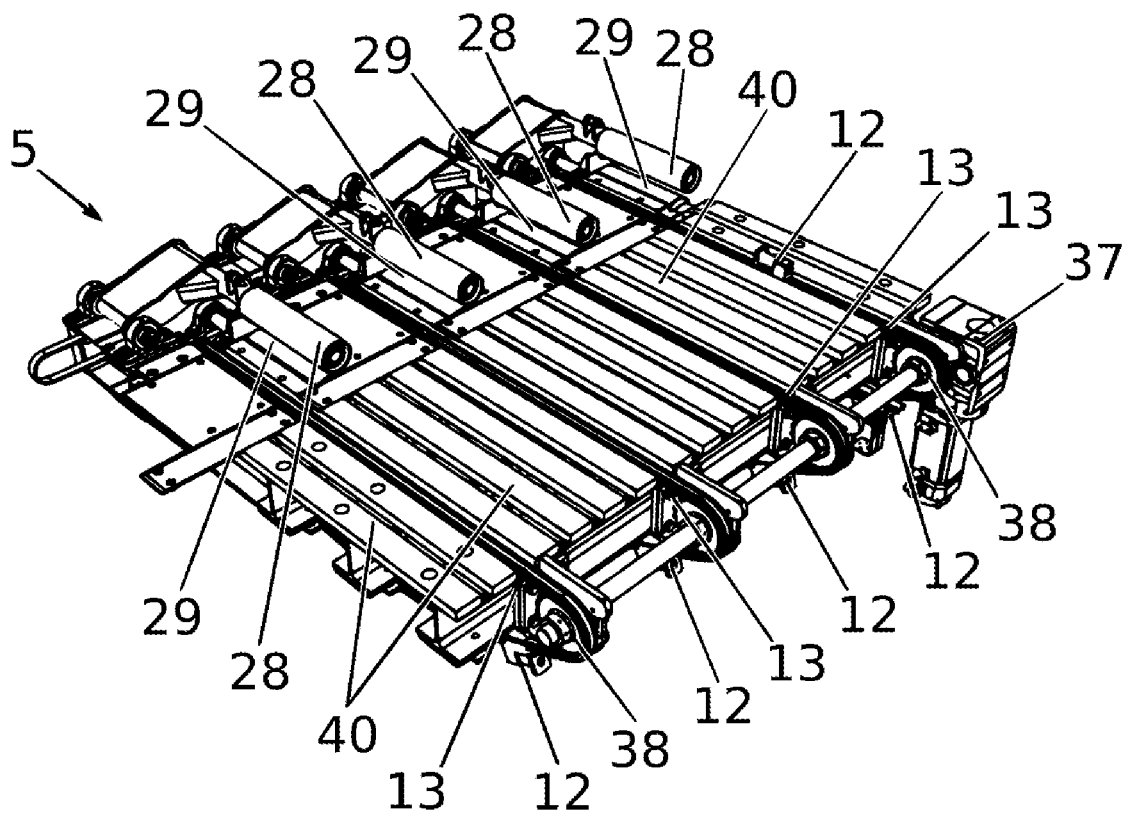
FIG. 14 table assembly in isometric projection.

FIG. 14 shows the structure of the work table assembly 5, which consists of a set of non-driven pressure rollers 28 and below it, a set of drive rollers 29, which enable longitudinal transport of a wooden lamella 26 through the press 1. Furthermore, it consists of a set of slide plates 40, along which wooden lamellas 26 and, after gluing, laminated plates 27 slide. Between the slide plates 40, endless chains 13, driven by sprockets 38 by means of the servo drive 37, are positioned at a distance from each other. At least two pusher dogs 12 are positioned on each endless chain 13.

Endless chains 13 with pusher dogs 12 within the work table assembly 5 enable fast feeding and emptying of the press and holding of the wooden lamellas 26 at the start or initial feeding. The pusher dogs 12 enable two modes of operation of the endless chain 13. According to the first mode, they enable, by means of the servo drive 37, holding and positioning of wooden lamellas 26 within the press 1 with a constant force. In the second mode they enable the emptying of the pressing area so that they push the glued laminated plate 27 out of it. The distance between the pusher dogs 12 on the endless chains 13 is always the same.

The procedure of width pressing and gluing of wooden lamellas 26 into laminated plates 27 is performed in three steps, which will be presented in continuation.

Figure 15:
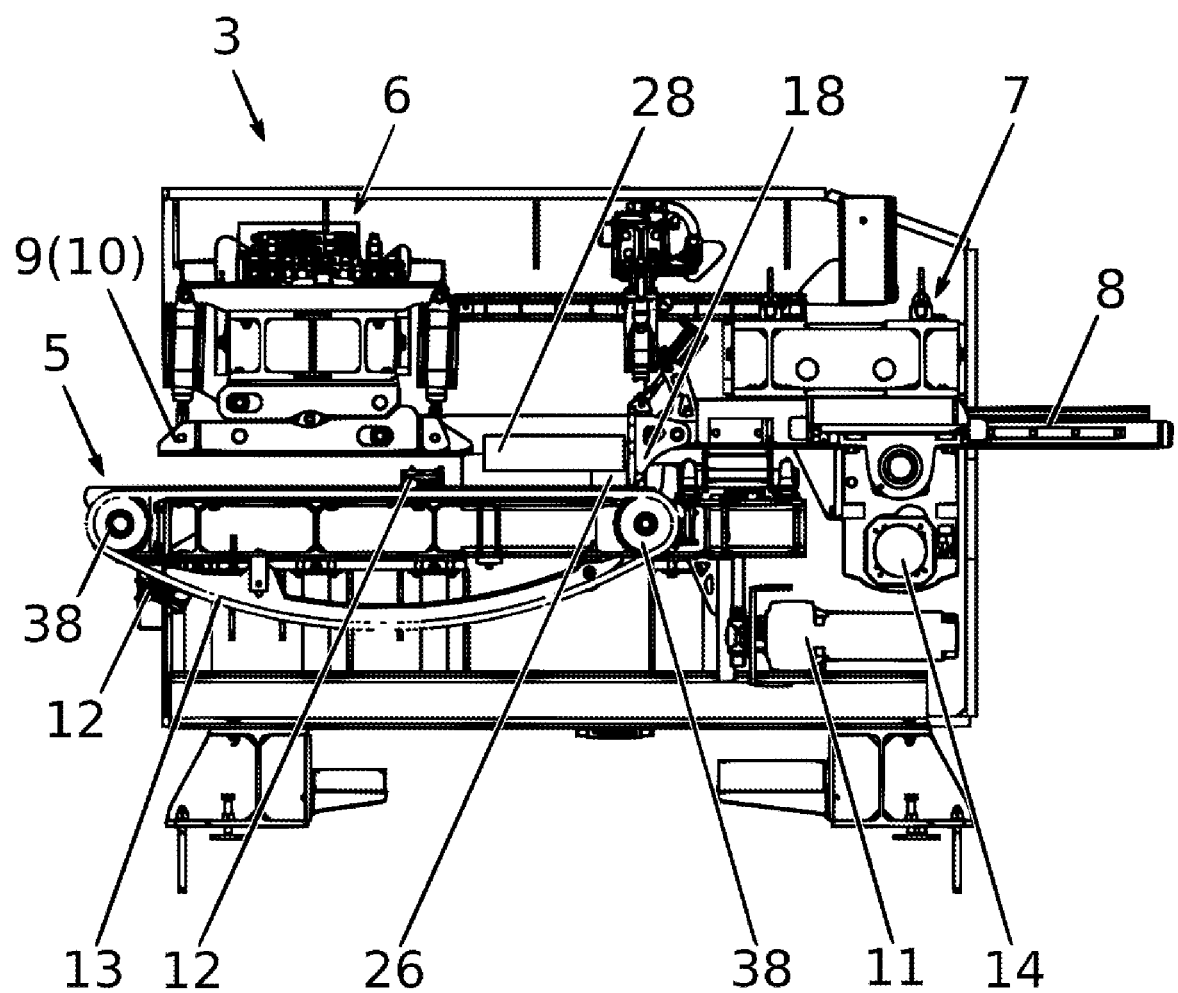
FIG. 15 presentation of longitudinal transport of a wooden lamella through the press.
Figure 16:
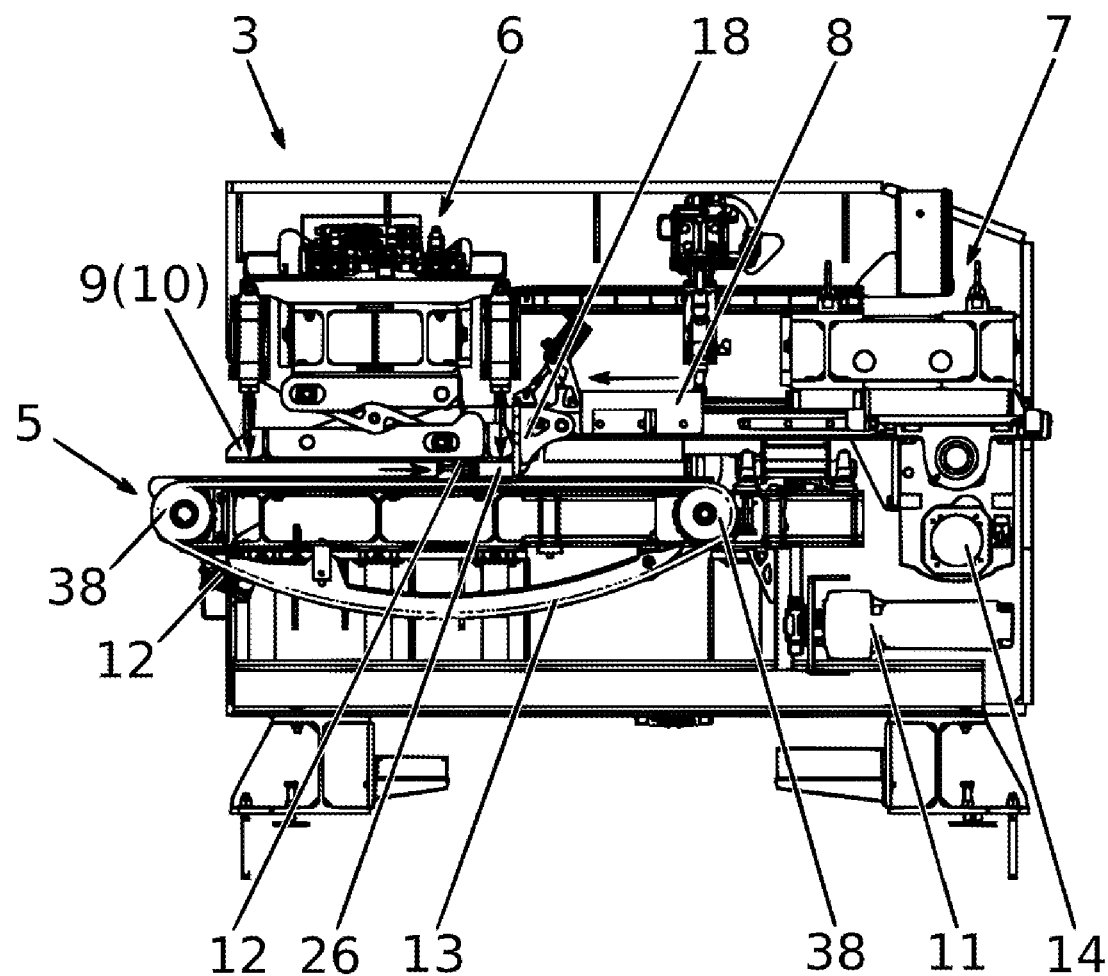
FIG. 16 presentation of transverse transport of a wooden lamella by means of segment pushers and pusher dogs, including the pressing of pressure shoes on it.

FIG. 15 and FIG. 16 show the first step of width joining of wooden lamellas 26, i.e. the longitudinal transport of the first wooden lamella 26 through the press 1, which is carried out on the drive rollers 29 and non-driven pressure rollers 28 within the work table assembly 5. The long pressures shoes 9 and the short pressure shoes 10 are in the lifted position to enable wooden lamellas 26 to enter under them.

FIG. 16 shows the transverse transport of the first wooden lamella 26 by means of segment pushers 8 and the endless chains 13 with the pusher dogs 12. Thereby the pusher dogs 12 press the wooden lamella 26 from the its front side against the lifting flap 18 so that the wooden lamella 26 is aligned along its longitudinal axis and they push it under the long pressure shoes 9 and the short pressure shoes 10, which than put pressure on the wooden lamella 26 so that it is kept in the aligned position.

Before width joining, it is required to align the wooden lamella 26 in the longitudinal direction and also in the direction of its thickness. The function of aligning the wooden lamella 26 is carried out by long pressure shoes 9 so that they put pressure on the wooden lamella 26 in the vertical direction, which is shown in FIG. 17.

Figure 21:
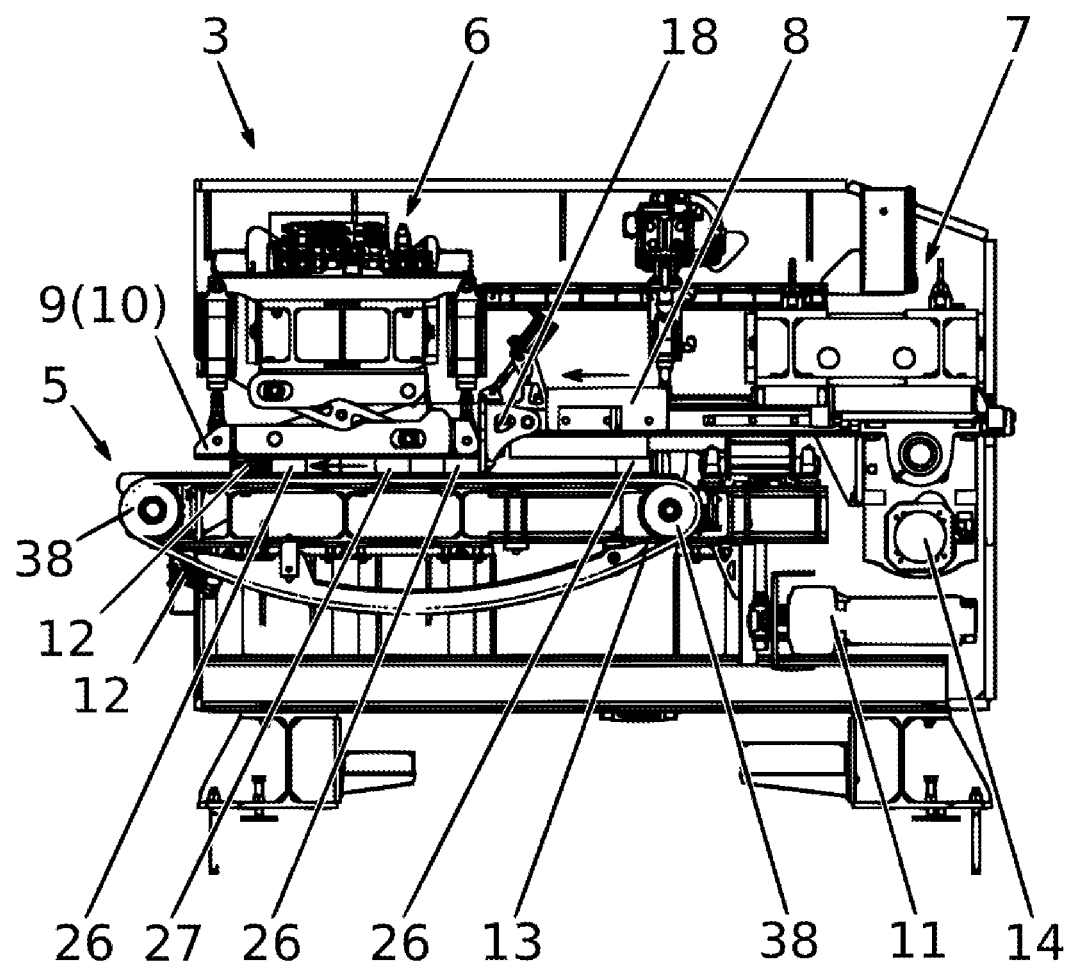
FIG. 21 same as in FIG. 16, only with simultaneous transport of a wooden lamella along the press.

FIG. 21 shows the second step of the width joining of wooden lamellas 26 into laminated plates 27, i.e. pressing and width gluing the second and all further wooden lamellas 26 while transporting the next wooden lamella 26 into and along the press 1. Thereby the segment pushers 8, during the transverse transport, push the wooden lamellas 26 under the long pressure shoes 9 and the short pressure shoes 10 and press them into a laminated plate 27, while at the same time, the longitudinal transport of new input wooden lamellas 26 through the press 1 is carried out.

Figure 22:
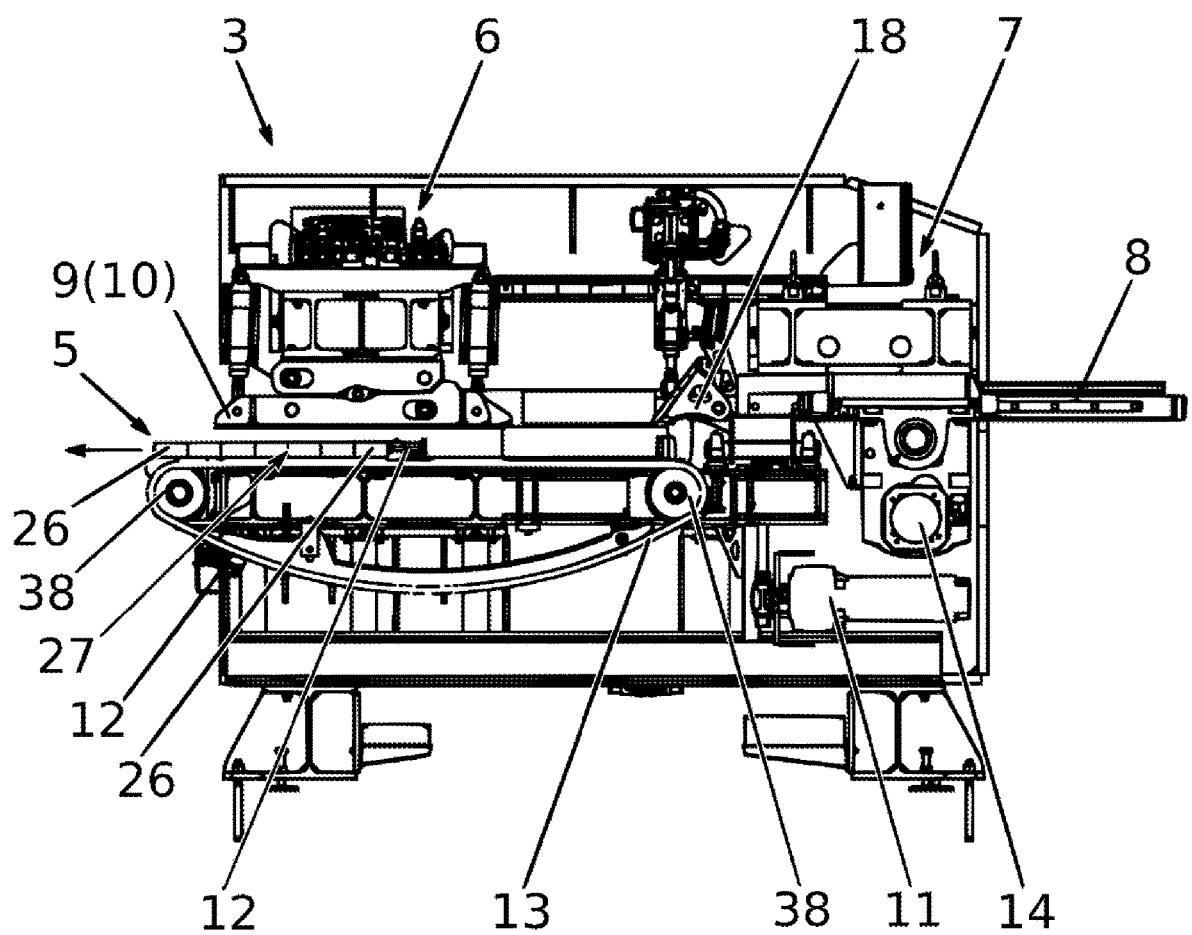
FIG. 22 transverse transport of a laminated plate on the way out of the press by means of pusher dogs.

FIG. 22 shows the third, last step of width joining of the wooden lamellas 26 into the laminated plates 27, i.e. transverse transport of the glued laminated plate 27 at the exit from the press 1 by means of the pusher dogs 12 on the endless chain 13.

FIG. 18 shows the position of the segment pusher 8 and the position of wooden lamellas 26 and the laminated plate 27 after width joining and after the lifting flap 18 is withdrawn from the laminated plate 27. Thus, the final position of the wooden lamellas 26 after the finished pressure of the segment pushers 8 and of their lifting flaps 18 is shown, in which the front edges of the wooden lamellas 26 are aligned with the edge of the short pressure shoe 10.

FIG. 19 shows the operation of forces on the observed long pressure shoe 9 and/or short pressure shoe 10 when they put pressure on the laminated plate 27. The pressure is put on the pressure element 22 of the long pressure shoe 9 or short pressure shoe 10 with the cylinders 17 in the directions J and K, with a different force. As a result, the pressure element 22 presses on the laminated plate 27 with the sum of the forces exerted by the cylinders 17.

FIG. 20 shows the operation of forces on the long pressure shoe 9 or the short pressure shoe 10 during width joining and gluing of wooden lamellas 26 into a laminated plate 27. Thereby the lifting flap 18 transversely transports the wooden lamella 26 and pushes it with a certain force in the direction R. At the moment, when the wooden lamella 26 touches or joins the previous or the last wooden lamella 26 in the already glued laminated plate 27, the transport of the previously joined and glued laminated plate 27 starts at the same time in the direction R. At the same time, the friction force of the base of the slide plate 40 occurs in the direction N and the friction force of the pressure element 22 in the direction M. Due to the friction force of the pressure element 22 in the direction M, reaction force in the direction L is created in the supporting bar 20 of the pressure shoes 9 and 10, which operates in the direction opposite to the direction of operation of cylinders 17 J and K. As a result, the forces J and K are reduced correspondingly and consequently the pressure element 22 presses on the lamella plate 27 with a reduced force J K-L.

The automatic machine or press 1 for fast width gluing of wooden lamellas 26 into laminated plates 27 can operate in two modes: primary and secondary. The primary mode means continuous pressing and gluing of wooden lamellas 26 of optional widths and lengths into laminated plates 27 of optional widths and lengths without later machining of the surface of the laminated plates 27. The secondary mode comprises the operation of the press 1 in the function of the transverse conveyor of the wooden lamellas 26 in cases where gluing of wooden lamellas 26 into laminated plates 27 is not necessary.

Continuous pressing and gluing of wooden lamellas 26 into laminated plates 27 is carried out in three steps. The first step is to fill the press 1, the second step is to press and glue the wooden lamellas 26 into the laminated plate 27 and the third step is to empty the press 1 or remove the glued laminated plate 27. Hereinafter, the description of pressing and gluing the wooden lamellas 26 within the press 1, for greater transparency, refers to a single wooden lamella 26, which applies equally to all other wooden lamellas 26 used for gluing the laminated plates 27 of certain dimensions.

The start of filling begins with the transport of the first wooden lamella 26 through the glue application device 2 into the press 1 without applying the glue.

The transport of a wooden lamella 26 in the press 1 is carried out on the drive rollers 29, located in the work table assembly 5 and driven with the servo drive 11. One servo drive 11 drives four drive rollers 29 in an individual work module 3, whereby the servo drives 11 of all built in work modules 3 are synchronised with each other.

Stopping the wooden lamella 26 in the press 1 at the predetermined position is carried out with high decelerations, and therefore the non-driven pressure rollers 28 are located in the work table assembly 5. The non-driven pressure rollers 28 operate cyclically and are located above the drive rollers 29. The non-driven pressure rollers 28 press on the observed wooden lamella 26 by means of a not indicated cylinder and thereby they provide the necessary friction between the drive rollers 29 and the wooden lamella 26. In this way, by means of the servo drive 11 on the drive rollers 29, it is achieved that the wooden lamella 26 stops at the exactly determined location or at the end position in the press 1. Thereby the non-driven pressure rollers 28 operate cyclically so that they put pressure on a wooden lamella 26 only when the wooden lamella 26 is located under them and they perform it as long as the wooden lamella 26 does not enter the pressing area of the press 1. That is, until the wooden lamella 26 does not enter the pressing area with at least half of its width, afterwards the non-driven pressure rollers 28 return to their initial, i.e. standstill position.

In parallel with the previously described procedure, endless chains 13 with pusher dogs 12 are positioned according to the width of the wooden lamella 26. As the long pressure shoes 9 and the short pressure shoes 10 are thereby in the standstill position, undisturbed entry of the wooden lamella 26 into the pressing area is made possible.

After the observed wooden lamella 26 is stopped at the end position after its entry into the press 1, the segment pusher 8 pushes it transversely under the long pressure shoes 9 and the short pressure shoes 10. At the same time, pusher dogs 12 come closer to the wooden lamella 26, the pusher dogs 12 straighten the wooden lamella 26 by means of the servo drive 37 if it is curved. This is followed by the pressure of long pressure shoes 9 and short pressure shoes 10 on the wooden lamella 26, which by means of the supporting bar 20 and the guide bar 21 of a scissor-like mechanism ensure that the pressure elements 22 of long pressure shoes 9 and of short pressure shoes 10 remain horizontally aligned. Their pressure put on the wooden lamella 26 also ensures that the wooden lamella 26 retains its straight form in spite of its curvature, if any.

The previously described is followed by the lifting of the lifting flaps 18 by means of the cylinder 15 and their withdrawal from the transport area of the press 1, while the segment pushers 8 are moved to their initial position. At the same time, the transport of the second or the next wooden lamella 26 through the glue application device 2 into the press 1 starts, which represents the beginning of a new cycle. In the described transport of the second and of all subsequent wooden lamellas 26 through the glue application device 2, glue is applied to their surfaces that are to be glued. The cycle of the initial filling of the press 1 ends when the segment pushers 8 return to their initial position and the lifting flap 18 is lowered to the pressing height.

The following wooden lamellas 26 that enter the press 1 are held with pusher dogs 12 until the pressing area under the long pressure shoes 9 and the short pressure shoes 10 is 80% filled up, afterwards the pusher dogs 12 withdraw to their standstill position. Thus, the purpose of the pusher dogs 12 is to hold the wooden lamellas 26 in the phase of filling up the pressing area and of transporting wooden lamellas 26 or laminated plates 27 when emptying the pressing area.

As previously described, the second step of gluing wooden lamellas 26 starts with the second wooden lamella 26 when glue is applied to it and to all the following wooden lamellas 26 in the glue application device 2 whereupon they are positioned at the end position according to the previously described procedure. Afterwards individual wooden lamellas 26 are pushed with segment pushers 8 to the pressing area of the press 1 and in this way they are glued with the previous wooden lamella 26 to form the laminated plate 27 with others. Thereby the non-driven pressure rollers 28 put pressure on the observed wooden lamella 26 until it enters the pressing area. When the wooden lamella 26 with 60% of its width enters into the pressing area, the non-driven pressure rollers 28 return to their initial, i.e. standstill position.

In order to ensure the constant pressure in the glued joint, the long pressure shoes 9 and the short pressure shoes 10 put pressure on the laminated plates 27 and thus they prevent any possible space between individual wooden lamellas 26, which is achieved with friction between them. For this reason, the wooden lamellas 26 and laminated plates 27 are kept in the pressing area of the press 1 until the glue dries. After gluing the last wooden lamella 26 to the laminated plate 27, the lifting flaps 18 are lifted and, simultaneously, the return movement of the segment pushers 8 to their standstill position is performed. Simultaneously with this, longitudinal transport of a wooden lamella 26 through the glue application device 2 into the press 1 is performed until the wooden lamella 26 is stopped at its end position.

After gluing of wooden lamellas 26 into laminated plates 27 is finished, the emptying of the press 1 starts. If the width of wooden lamellas 26 is to be changed, the press 1 can continue the continuous gluing of laminated plates 27 without stopping.

After the last wooden lamella 26 is pushed to the pressing area of the press 1, the return stroke of segment pushers 8 to their initial position follows, while, simultaneously, the lifting flap 18 is lifted and withdrawn from the transport area. This is followed by lifting up the long pressure shoes 9 and the short pressure shoes 10 to the standstill position, and the glued laminated plate 27 is ready for transport from the press 1 by means of the pusher dogs 12.

In case of wide wooden lamellas 26, when their gluing or width joining into laminated plates 27 is not always necessary, the construction of the press 1 according to the present invention enables its operation as a transverse conveyor.

The invention claimed is:

1. An automatic machine for width gluing of wooden lamellas into laminated plates of optional dimensions comprising a press and an entry glue application device, wherein the press comprises a supporting framework, a work table assembly with endless chains with pusher dogs and non-driven pressure rollers and drive rollers, and further comprising a pressure shoes assembly and a segment pushers assembly, wherein:
    the press is based on a modular construction, comprising at least two in a string positioned work modules, wherein each of the work modules comprises at least one work table assembly, at least one pressure shoes assembly and at least one segment pushers assembly, whereby the pressure shoes assembly comprises at least two long pressure shoes and short pressure shoes arranged in an alternating sequence;
    the work modules are fixed to supporting framework segments so that their work area is located in a same plane as the cut-outs on the supporting framework segments, in order to ensure transit or transport of wooden lamellas in a same plane, both in transverse as well as in longitudinal directions within the press;
    the work modules are interconnected by the supporting framework segments so that each individual work module is surrounded by at least two of the supporting framework segments with an elongated cut-out opened at one side;
    the ends of a pressure element of each pressure shoes assembly are movably joined, via cylinders, with both ends of a carrying element, which is fixed to a framework, and the pressure element is guided via guide, whereas, via pivots and track roller bearings in guide grooves, the pressure element is movably connected with a scissor construction of supporting bar and guide bar with a common pivot, which enables a vertical movement of the pressure element in direction F;
    at a front end of each segment pusher, via pivot, a lifting flap with a corresponding cylinder is oscillatingly attached so that it can be lifted and lowered, whereby the lifting flap in its lowered position rests on a toothed rack and whereby they together form a contact surface, which is located in a same plane as a pressing height and in this way it is mechanically self-locking.

2. The automatic machine according to claim 1, wherein the supporting framework segments are positioned perpendicular to a longitudinal axis of the press so that they, with the open part of the cut-out, are turned in a direction of a pressing area on the front side of the press.

3. The automatic machine according to claim 1, wherein the segment pushers are located between the long pressure shoes so that after the wooden lamella is glued to the laminated plate, they lie immediately next to the short pressure shoes.

4. The automatic machine according to claim 1, wherein, when the lifting flap is lowered and/or lifted on the segment pushers, a longitudinal transport of wooden lamellas under the toothed rack is enabled.

5. The automatic machine according to claim 1, wherein the scissor construction of the supporting bar and the guide bar is clamped movably in five points, whereby the supporting bar can rotate via pivot, in direction H, whereas the movement of track roller bearings is limited within the guide grooves, which represents a restriction of translation of the track roller bearings in direction G.

6. The automatic machine according to claim 1, wherein the guide enables the alignment of the pressure element of the long pressure shoes and of the short pressure shoes towards their carrying element.

7. The automatic machine according to claim 1, wherein the lifting flap rotates by means of a cylinder round a pivot in direction P, and the lifting flap is self-locking at the pressing height due to a blockade on the contact surface on the toothed rack.

8. The automatic machine according to claim 1, wherein endless chains with at least two pusher dogs spaced from each other are positioned between slide plates of the work table assembly.

9. The automatic machine according to claim 1, wherein segment pushers are driven with a servo drive via toothed racks.

10. A method of pressing and gluing wooden lamellas into laminated plates, the method comprising:
    providing an automatic machine as claimed in claim 1, wherein:

wooden lamellas are longitudinally transported from the glue application device between the non-driven pressure rollers and the drive rollers through the cut-outs in the supporting framework segments into an area of work modules of the press, where they are stopped at their end position by means of servo drive on the drive rollers;

pusher segments push wooden lamellas from their end position in the transverse direction under the long pressure shoes and the short pressure shoes, whereby pusher dogs on the endless chains move closer to wooden lamellas to align, by means of the servo drive;

lifting lifting flaps on the segment pushers and a return stroke of the segment pushers to a standstill position, whereby a cycle of gluing observed wooden lamella is finished, whereas at a same time, a longitudinal transport of a next wooden lamella along the drive rollers to the press is performed as a part of a next gluing cycle, which is cyclically repeated in the sequence described.

* * * * *